(12) United States Patent
Rekimoto

(10) Patent No.: US 10,543,414 B2
(45) Date of Patent: Jan. 28, 2020

(54) IMAGE PROCESSING DEVICE AND IMAGE PROCESSING SYSTEM

(71) Applicant: SONY CORPORATION, Tokyo (JP)

(72) Inventor: Junichi Rekimoto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 96 days.

(21) Appl. No.: 15/505,488

(22) PCT Filed: Jul. 15, 2015

(86) PCT No.: PCT/JP2015/070312
§ 371 (c)(1),
(2) Date: Feb. 21, 2017

(87) PCT Pub. No.: WO2016/031417
PCT Pub. Date: Mar. 3, 2016

(65) Prior Publication Data
US 2017/0266529 A1    Sep. 21, 2017

Related U.S. Application Data

(60) Provisional application No. 62/043,127, filed on Aug. 28, 2014.

(51) Int. Cl.
*A63B 69/12* (2006.01)
*H04N 13/207* (2018.01)
(Continued)

(52) U.S. Cl.
CPC ............ *A63B 69/12* (2013.01); *A63B 33/002* (2013.01); *H04N 13/207* (2018.05);
(Continued)

(58) Field of Classification Search
CPC .. H04N 13/207; H04N 13/383; H04N 13/344; H04N 13/341; H04N 13/30; H04N 13/363; H04N 13/366; H04N 13/398
(Continued)

(56) References Cited

U.S. PATENT DOCUMENTS 5,271,106 A * 12/1993 McClish .............. A63B 69/125
352/89
7,046,440 B1 * 5/2006 Kaehr ...................... E04H 4/14
359/464

(Continued)

FOREIGN PATENT DOCUMENTS

JP    03-277386    3/1990
JP    06-221009    8/1994
(Continued)

OTHER PUBLICATIONS

JPH06221009 Translation.*
(Continued)

*Primary Examiner* — Nguyen T Truong
(74) *Attorney, Agent, or Firm* — Paratus Law Group, PLLC

(57) ABSTRACT

There is provided an image processing device to enable a user to experience a VR space in a floating state, the image processing device including: a wall configured to form a water storage space; and an image generating unit configured to generate a stereoscopic view image to be displayed on the wall toward an inside of the water storage space.

20 Claims, 26 Drawing Sheets

(51) Int. Cl.
  *H04N 13/344*  (2018.01)
  *H04N 13/366*  (2018.01)
  *H04N 13/398*  (2018.01)
  *H04N 13/363*  (2018.01)
  *A63B 33/00*  (2006.01)
  *H04N 13/341*  (2018.01)
  *H04N 13/383*  (2018.01)

(52) U.S. Cl.
  CPC ......... *H04N 13/344* (2018.05); *H04N 13/363* (2018.05); *H04N 13/366* (2018.05); *H04N 13/398* (2018.05); *A63B 69/125* (2013.01); *A63B 2207/02* (2013.01); *A63B 2208/03* (2013.01); *A63B 2220/801* (2013.01); *A63B 2220/803* (2013.01); *A63B 2220/807* (2013.01); *A63B 2220/836* (2013.01); *A63B 2220/89* (2013.01); *H04N 13/341* (2018.05); *H04N 13/383* (2018.05)

(58) Field of Classification Search
  USPC .......................................................... 348/46
  See application file for complete search history.

(56) References Cited

U.S. PATENT DOCUMENTS

2005/0243651 A1* 11/2005 Bailey Brad .......... A63B 69/12
  368/10
2010/0238161 A1* 9/2010 Varga ...................... G06T 17/05
  345/419

FOREIGN PATENT DOCUMENTS

| JP | 09-021245 | 1/1997 |
| JP | 2001-129245 | 5/2001 |
| JP | 2003-168136 | 6/2003 |
| JP | 2005-007114 | 1/2005 |

OTHER PUBLICATIONS

JP2001129245 Translation.*
JP2005007114 Translation.*
Carolina Cruz-Neira, "Surround-Screen Projection-Based Virtual Reality: The Design and Implementation of the CAVE", 1993.*

* cited by examiner

IMAGE PROCESSING DEVICE AND IMAGE PROCESSING SYSTEM

CROSS REFERENCE TO PRIOR APPLICATION

This application is a National Stage Patent Application of PCT International Patent Application No. PCT/JP2015/070312 (filed on Jul. 15, 2015) under 35 U.S.C. § 371, which claims priority to U.S. Provisional Application No. 62/043,127 (filed on Aug. 28, 2014), which are all hereby incorporated by reference in their entirety.

TECHNICAL FIELD

The present disclosure relates to an image processing device and an image processing system.

BACKGROUND ART

In recent years, techniques of presenting a user with an immersive virtual reality (VR) space have attracted attention. For example, Non-Patent Literature 1 discloses a technique of causing a stereoscopic view image to be displayed on a wall surface, a bottom surface, or the like of a room to a user who is in the room according to a point-of-view position of the user (a so-called CAVE). Through such a technique, the user can experience a feeling that he/she is in a VR space without recognizing the wall surface of the room.

CITATION LIST

Non-Patent Literature

Non-Patent Literature 1: Carolina Cruz-Neira, Daniel J. Sandin, Thomas A. DeFanti, Robert V. Kenyon and John C. Hart. "The Cave: Audio Visual Experience Automatic Virtual Environment," Communications of the ACM, Vol. 35 (6), 1992, pp. 64-72

DISCLOSURE OF INVENTION

Technical Problem

In the technique disclosed in Non-Patent Literature 1, the user can experience the VR space with various postures such as a standing posture or a sitting posture. However, the user is unable to experience the VR space while feeling a state in which his/her body is floating.

In this regard, the present disclosure proposes an image processing device and an image processing system, which are new and improved and enable a user to experience the VR space in the floating state.

Solution to Problem

According to the present disclosure, there is provided an image processing device, including: a wall configured to form a water storage space; and an image generating unit configured to generate a stereoscopic view image to be displayed on the wall toward an inside of the water storage space.

According to the present disclosure, there is provided an image processing system, including: a wall configured to form a water storage space; and an image generating unit configured to generate a stereoscopic view image to be displayed on the wall toward an inside of the water storage space.

Advantageous Effects of Invention

As described above, according to the present disclosure, it is possible to experience the VR space in the floating state.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
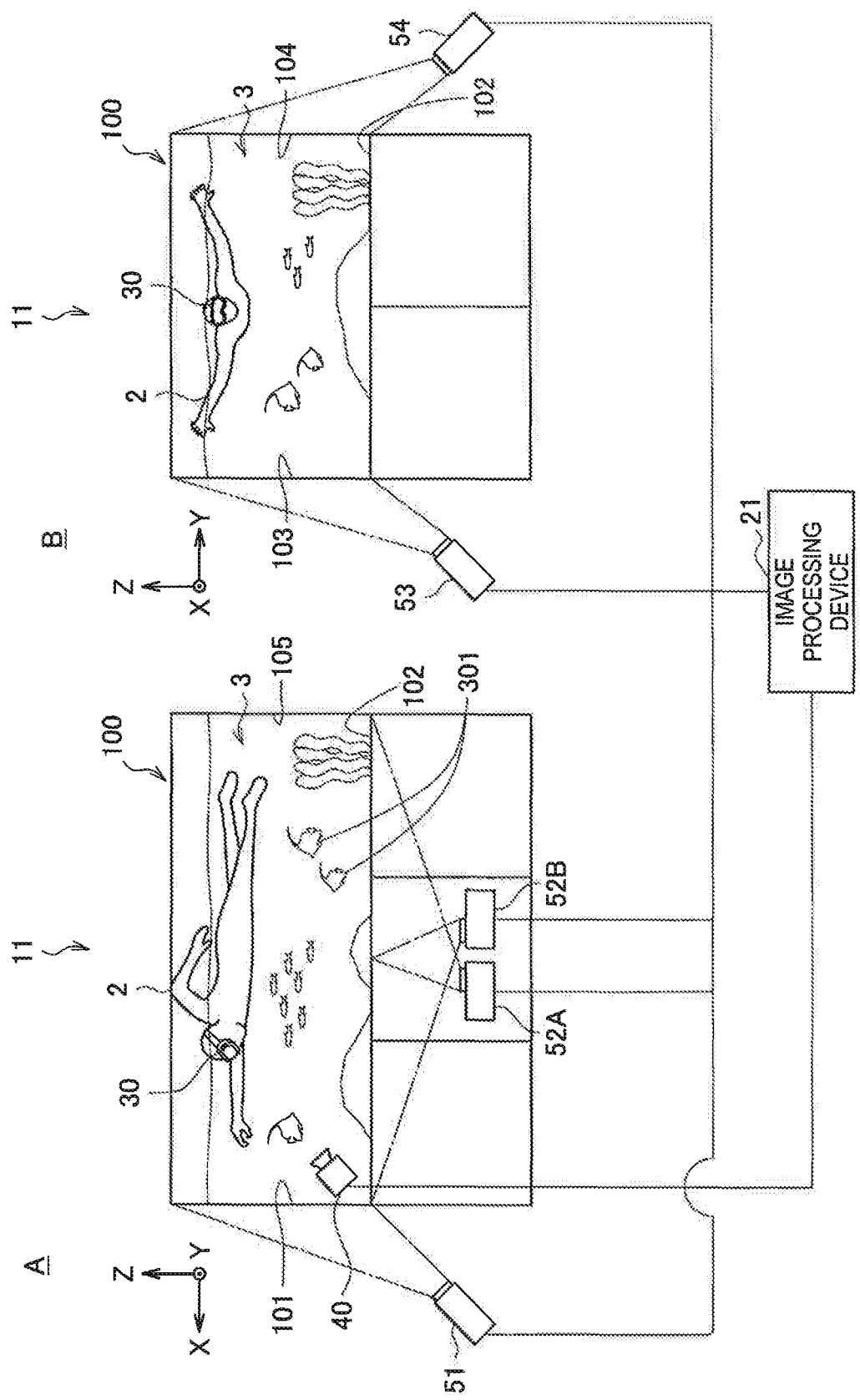
FIG. 1 is a diagram illustrating an overview of a configuration of an image processing system according to a first embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Further, description will proceed in the following order.
1. First embodiment
1.1. Configuration of image processing system
1.2. Exemplary configuration of image processing device
1.3. Exemplary operation of image processing device
1.4. Effects and supplements
1.5. Modified example
2. Second embodiment
3. Third embodiment
4. Fourth embodiment
5. Fifth embodiment
6. Sixth embodiment
7. Seventh embodiment
8. Hardware configuration
9. Conclusion 1. First Embodiment

[1.1. Exemplary Configuration of Image Processing System]

FIG. 1 is a diagram illustrating an overview of a configuration of an image processing system 11 according to a first embodiment of the present disclosure. As illustrated in FIG. 1, the image processing system 11 includes an image processing device 21, goggles 30, an imaging device 40, projecting devices 51 to 54, and a water tank 100. The imaging device 40 and the projecting devices 51 to 54 are connected with the image processing device 21 via various kinds of wired or wireless networks. A of FIG. 1 illustrates a configuration of the image processing system 11 viewed in a Y-axis direction, and A of FIG. 1 illustrates a configuration of the image processing system 11 viewed in an X-axis direction. The configurations of A and B of FIG. 1 are the same configuration.

(Water Tank)

The water tank 100 forms a water storage space. As illustrated in FIG. 1, the water tank 100 includes side surfaces 101, 103, 104, and 105, and a bottom surface 102 (hereinafter referred to simply as a "wall surface" when they are not distinguished) as walls. Each of the wall surfaces is joined to, for example, edges of other wall surfaces. The joint portions are appropriately waterproofed so that water 3 does not leak. Thus, the water tank 100 can store the water 3 in a space surrounded by the wall surfaces. The wall surfaces may be integrally formed. In the example illustrated in FIG. 1, the water tank 100 has a substantially rectangular parallelepiped shape, but the present technology is not limited to this example. A shape of the water tank 100 is not particularly limited as long as it has a structure capable of storing water. For example, the water tank 100 may have a cylindrical or truncated conical shape. It is desirable that the water tank 100 have, for example, a size in which a body of at least one person can float in the water 3.

For example, the wall surfaces of the water tank 100 are formed of a material which is transparent and has a high strength characteristic such as acrylic or glass. Thus, it is possible to cause an image projected from the outside to be displayed toward the inside of the water tank 100 while resisting inner pressure of the water 3 stored in the water tank 100 or pressure caused by collisions of a user 2 and the wall surfaces. A projection film onto which a stereoscopic view image projected through a projecting device 50 which will be described later is projected may be attached to each of the wall surfaces. For example, the projection film may be a rear projection film for displaying an image in a projection direction of the projecting device 50. Further, when the projecting device 50 is installed in the water tank 100, the stereoscopic view image is projected onto the inner side of the wall surfaces of the water tank 100. In this case, the wall surfaces of the water tank 100 may be formed of a non-transparent material.

(Image Processing Device)

The image processing device 21 is configured with an information processing device having an image processing function. For example, the image processing device 21 is implemented by any device having an image processing function such as a personal computer (PC), a tablet, or a smart phone. Further, the image processing device 21 may be configured with one or more information processing devices on a network. The information processing device constituting the image processing device 21 may include a processing circuit and a communication device. For example, the image processing device 21 acquires position information of the goggles 30 from the imaging device 40 using the communication device, performs an estimation process of the point-of-view position of the user and an image generation process based on the estimated point-of-view position through the processing circuit, and outputs a generated stereoscopic view image to the projecting device 50 using the communication device. A functional configuration of implementing the functions of the image processing device 21 will be described later.

(Goggles)

The goggles 30 are worn on the head of the user 2. The goggles 30 include a liquid crystal shutter. The liquid crystal shutter has a function of shielding the left and right fields of view of the user 2 according to a display timing of the stereoscopic view image. The liquid crystal shutter includes a control unit (not illustrated) that controls shielding of the left and right fields of view. For example, the liquid crystal shutter opens the field of view of the left eye and shields the field of view of the right eye at a timing at which a left eye stereoscopic view image is displayed. Further, the liquid crystal shutter opens the field of view of the right eye and shields the field of view of the left eye at a timing at which a right eye stereoscopic view image is displayed. Then, the control unit of the liquid crystal shutter performs control such that the display timings of the stereoscopic view images corresponding to the left and right eyes are synchronized with the left and right shielding timings of the liquid crystal shutter, and the stereoscopic view images corresponding to the left and right eyes are alternately displayed (a so-called frame sequential method). Thus, it is possible to continuously display appropriate stereoscopic images to the user 2.

The shielding control method of the liquid crystal shutter is not particularly limited. For example, the shielding control method may be a DLP link method using digital light processing (DLP). Specifically, a synchronous frame for synchronizing the shielding timings of the left and right fields of view of the liquid crystal shutter with the display timing of the stereoscopic view image is inserted between two of a plurality of frames for continuously displaying an image whose output is controlled by the image processing device 21. A photo sensor installed in the goggles 30 recognizes the frame as a synchronous signal of the stereoscopic view image. Then, the control unit of the liquid crystal shutter may control whether or not the left and right fields of view of the liquid crystal shutter are shielded based on a recognition result. Thus, when the user 2 wearing the goggles 30 views the stereoscopic view images displayed on the wall surfaces of the water tank 100, the display timings of the stereoscopic view images corresponding to the left and right eyes are automatically synchronized with the shielding timings of the fields of view of the liquid crystal shutter. Further, through this method, shielding control of the field of view of the liquid crystal shutter can be performed regardless of the point-of-view position for the stereoscopic view image. Further, the shielding control of the liquid crystal shutter may be performed using wireless communication through the image processing device 21. For example, the image processing device 21 may perform control such that the liquid crystal shutter opens the field of view of the left eye and shields the field of view of the right eye according to a timing at which the left eye stereoscopic view image is displayed on the wall surfaces.

A marker may be attached to the goggles 30. For example, the marker may be a light emission source such as an infrared LED, a characteristic print pattern, or the like. When the marker is attached to the goggles 30, the imaging device 40 which will be described later recognizes the position of the marker. Thus, it is possible to estimate the position of the user wearing the goggles 30. The goggles 30 and the marker are examples of a marker member.

(Imaging Device)

The imaging device 40 is a device that photographs a real space using various kinds of members such as an imaging sensor such as a charge coupled device (CCD) or a complementary metal oxide semiconductor (CMOS) and lenses for controlling image formation of a subject image on the imaging sensor. The imaging device 40 recognizes the position of the marker attached to the goggles 30 worn by the user 2 who is in the water storage space. In the example illustrated in FIG. 1, the imaging device 40 is installed near the bottom surface of the water tank 100 so that an image direction of the imaging device 40 becomes a direction of the inside of the water storage space. Thus, the imaging device 40 can image the goggles 30 worn by the user 2 who is swimming in the water storage space with a high probability. The imaging device 40 outputs a recognition result of the marker to the image processing device 21. The number of installed imaging devices 40 is not particularly limited. As the number of installed imaging device 40 increases, a plurality of recognition results of the marker can be obtained. Thus, the accuracy of the recognition result related to the position of the marker can be improved. Further, the imaging device 40 may be installed at an arbitrary position inside or outside the water tank 100 as long as the imaging device 40 can recognize the marker of the goggles 30. Further, when no marker is attached to the goggles 30, the imaging device 40 may recognize the position of the goggles 30 by recognizing a shape or the like of the goggles 30. For example, the imaging device 40 may recognize the position of the goggles 30 according to a shape, a size, or a direction of the recognized goggles 30.

(Projecting Device)

Each of the projecting devices 51 to 54 (hereinafter referred to as a "projecting device 50" when they are not particularly distinguished) is a device that causes a projection image to be projected onto a projection plane by radiating light emitted from a light source through a display device. For example, the projecting device 50 may be a DLP projector (registered trademark), a liquid crystal projector, a liquid crystal on silicon (LCOS) projector, or the like. In the present embodiment, the projecting device 50 may project an image of 120 frames per second onto the wall surfaces of the water tank 100. In this case, consequently, the projecting device 50 projects a stereoscopic view image of 60 frames per second onto each of the wall surfaces. Thus, the user 2 can continuously view the stereoscopic image. The number of frames projected by the projecting device 50 is not particularly limited. The projecting device 50 is installed at an appropriate position inside or outside the water tank 100 in order to project the stereoscopic view image output from the image processing device 21 onto the wall surfaces of the water tank 100. In the example illustrated in FIG. 1, the projecting device 51 is installed outside the side surface 101 to project the stereoscopic view image onto the side surface 101 of the water tank 100. The projecting devices 52A and 52B are installed below the bottom surface 102 to project the stereoscopic view image onto the bottom surface 102 of the water tank 100. The projecting device 53 is installed outside the side surface 103 to project the stereoscopic view image onto the side surface 103 of the water tank 100. The projecting device 54 is installed outside the side surface 104 to project the stereoscopic view image onto the side surface 104 of the water tank 100. The number of installed projecting devices 50 is not particularly limited. For example, the number of projecting devices 50 can be appropriately adjusted according to the number of surfaces or an area onto which the stereoscopic view image is projected, a quantity of light which is necessary, or the like. In the present embodiment, the stereoscopic view image is not projected onto the side surface 105 of the water tank 100, but in another embodiment, the stereoscopic view image may be projected onto the side surface 105. Further, in the present embodiment, the water tank 100 has an opening formed on the upper portion, but in another embodiment, a top panel may be formed on the upper portion of the water tank 100, and the stereoscopic view image may be projected onto the top panel.

According to the image processing system 11 of the present embodiment, the imaging device 40 recognizes the position of the marker attached to the goggles 30 worn by the user 2, and the image processing device 21 estimates the point-of-view position of the user 2 based on the position of the marker recognized by the imaging device 40. Further, the image processing device 21 generates the stereoscopic view image according to the point-of-view position, and performs control such that the stereoscopic view image is displayed on the wall surfaces of the water tank 100. Thus, the user 2 views the stereoscopic image which is expressed through the stereoscopic view images displayed on the wall surfaces of the water tank 100 at any position while floating in the water storage space due to buoyancy force of the water 3. For example, the user 2 can view a stereoscopic image 301 of fishes expressed through the stereoscopic view image while swimming in the water storage space. Thus, when the user 2 wears the goggles 30 provided with the liquid crystal shutter, the user 2 can experience the VR space in which he/she is swimming under the sea. In other words, the user 2 can experience the VR space providing a floating feeling through a feeling of wearing swimming goggles without wearing a device providing a strong wearing sensation such as a head mount display (HMD). The image processing device 21 that implements the image processing system 11 according to the present embodiment will be described below.

[1.2. Exemplary Configuration of Image Processing Device]

Figure 2:
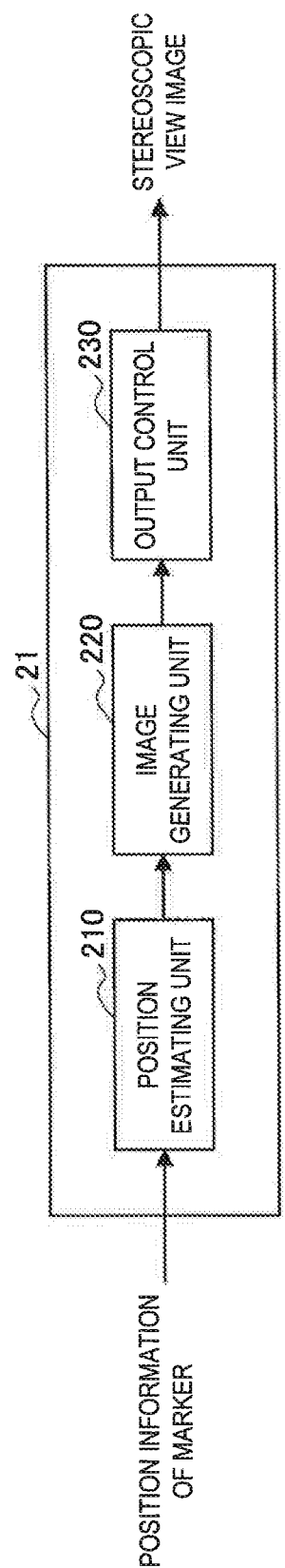
FIG. 2 is a block diagram illustrating an exemplary functional configuration of an image processing device according to the embodiment.

FIG. 2 is a block diagram illustrating an exemplary functional configuration of the image processing device 21 according to the first embodiment of the present disclosure. Referring to FIG. 2, the image processing device 21 includes a position estimating unit 210, an image generating unit 220, and an output control unit 230.

(Position Estimating Unit)

The position estimating unit 210 estimates the point-of-view position in the water storage space. The point-of-view position is, for example, a position of the eye of the user 2 which is in the water storage space. The position of the eye of the user 2 refers the position of the left and right eyes of the user 2. The position estimating unit 210 estimates the point-of-view position based on, for example, the position information of the marker attached to the goggles 30 recognized by the imaging device 40. The goggles 30 including the marker attached thereto are worn on the head of the user 2. For this reason, the marker is positioned near the head of the user 2. This is because a relative position relation between the marker and the eye of the user 2 does not change. Thus, the position estimating unit 210 can estimate the position of the eye of the user 2 based on the position of the marker using the relative position of the eye of the user 2 based on the position of the marker. The relative position may be defined based on, for example, a three-dimensional coordinate system having the position of the marker as an original point. The relative position may be fixed or may be appropriately changed according to, for example, a feature of the body of the user 2 including the head. The position estimating unit 210 outputs an estimation result of the point-of-view position to the image generating unit 220.

(Image Generating Unit)

The image generating unit 220 generates the stereoscopic view image to be displayed on the wall surfaces of the water tank 100 facing the inside of the water storage space. The stereoscopic view image is an image using a parallax between the eyes and configured with different images that cause a parallax between the left and right eyes of the user 2. The image generating unit 220 generates the left eye stereoscopic view image and the right eye stereoscopic view image, and the stereoscopic view images are alternately displayed on a display surface. The user 2 can view the stereoscopic image by viewing the stereoscopic view images according to the left and right eyes with the left and right eyes.

For example, the image generating unit 220 generates the stereoscopic view image expressing the depth from each of the wall surfaces according to a certain point-of-view position in the water storage space. By adjusting the parallax at the point-of-view position for the stereoscopic view images, it is possible to implement the VR space having the depth in the water storage space. Thus, for example, when the user 2 views the wall surfaces on which the stereoscopic view image is displayed from the point-of-view position, the user 2 can view the stereoscopic image expressed by the stereoscopic view image. The stereoscopic view image expressing the depth according to the point-of-view position can be generated using a known technique.

The image generating unit 220 may generate the stereoscopic view image according to the point-of-view position estimated by the position estimating unit 210. More specifically, the image generating unit 220 may generate the 0 stereoscopic view image having the parallax which is adjusted according to the point-of-view position estimated by the position estimating unit 210. Thus, for example, even when the point-of-view position of the user 2 changes, the image generating unit 220 generates the stereoscopic view image in which the depth is expressed to the user 2. Thus, even when the user 2 moves in the water storage space, the user 2 can view the stereoscopic image at the position to which he/she has moved.

Further, the image generating unit 220 may generate the stereoscopic view images which are displayed in association with the wall surfaces of the water tank 100. For example, the image generating unit 220 may generate the stereoscopic view images which are displayed on the side surfaces 101, 103 and 104, and the bottom surface 102.

The image generating unit 220 outputs the generated stereoscopic view images to the output control unit 230.

(Output Control Unit)

The output control unit 230 performs control such that the stereoscopic view images generated by the image generating unit 220 are output. For example, the output control unit 230 performs control such that the generated stereoscopic view images are output to the projecting device 50. More specifically, the output control unit 230 performs control such that the generated stereoscopic view images are output to the projecting device 50 corresponding to the wall surfaces serving as the display surface. For example, referring to FIG. 1, the output control unit 230 performs control such that the stereoscopic view image to be displayed on the side surface 101 of the water tank 100 is output to the projecting device 51.

Further, the output control unit 230 performs control such that the left or right eye stereoscopic view image among the generated stereoscopic view images is output to the wall surfaces of the water tank 100 at a predetermined timing. The output control unit 230 performs control such that the left eye stereoscopic view image and the right eye stereoscopic view image are alternately output to the wall surfaces. At this time, the output control unit 230 performs control such that a special frame for synchronizing the shield timings of the left and right fields of view by the liquid crystal shutter of the goggles 30 with the display timing of the stereoscopic view image is output in addition to the stereoscopic view image.

[1.3. Exemplary Operation of Image Processing Device]

Figure 3:
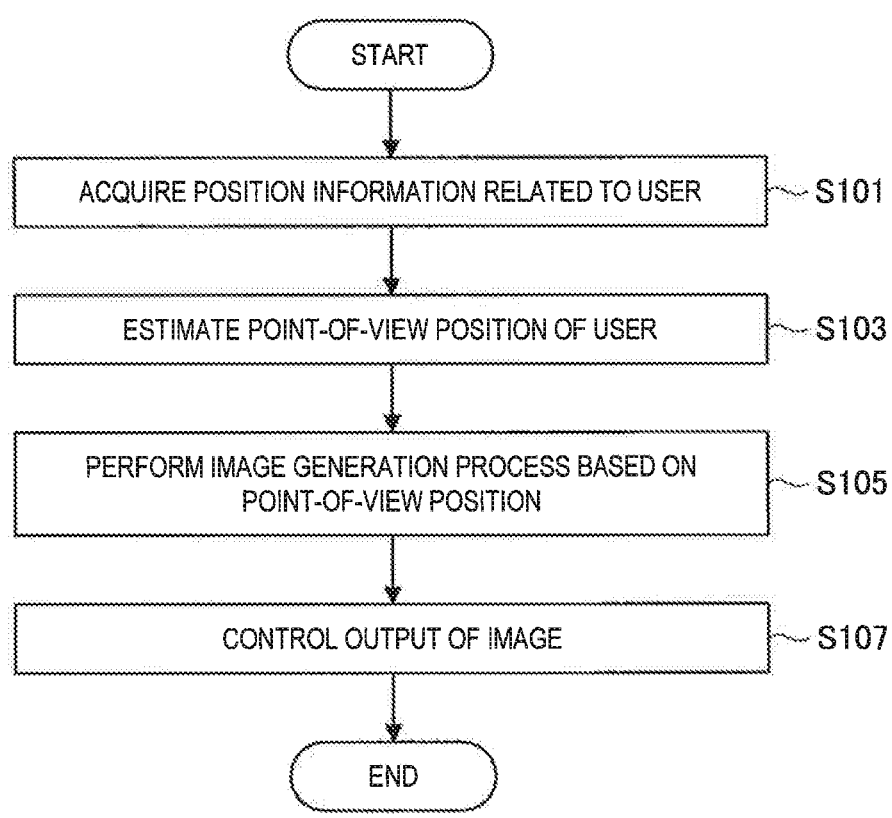
FIG. 3 is a flowchart illustrating an operation of the image processing device according to the embodiment.

FIG. 3 is a flowchart illustrating an operation of the image processing device 21 according to the first embodiment of the present disclosure. Referring to FIG. 3, first, the image processing device 21 acquires the position information related to the user 2 (S101). Specifically, the imaging device 40 recognizes the position of the marker attached to the goggles 30 worn by the user 2, and the position estimating unit 210 acquires position information of the recognized marker. The position information of the marker may be acquired using communication with the imaging device 40 through a communication device with which the image processing device 21 is equipped.

Then, the image processing device 21 estimates the position of the eye of the user 2 based on the position information of the marker (S103). Specifically, the position estimating unit 210 estimates the position of the eye of the user 2 as the point-of-view position. Then, the image processing device 21 generates the stereoscopic view image according to the point-of-view position of the user 2 (S105). Specifically, the image generating unit 220 generates the stereoscopic view image according to the point-of-view position of the user 2 estimated by the position estimating unit 210.

Then, the image processing device 21 performs control such that the stereoscopic view images are output (S107). Specifically, the output control unit 230 performs control such that the stereoscopic view images generated by the image generating unit 220 are output to the projecting device 50.

The image processing device 21 repeatedly perform steps S101 to S107.

[1.4. Effects and Supplements]

As illustrated in FIG. 1, according to the image processing system 11 of the present embodiment, the image processing device 21 performs control such that the point-of-view position of the user 2 who floats in the water storage space formed by the water tank 100 is estimated, the stereoscopic view image according to the point-of-view position is generated, and the stereoscopic view image is output toward the inside of the water storage space. Thus, the user 2 in the water storage space can experience the VR space configured with the stereoscopic image from various positions in the floating state.

Through this configuration, for example, it is possible to continue a swimming exercise for a long time. When swimming is performed as training for a long time, since the user has to continuously swim while facing a bottom of a pool for a long time, it is difficult to maintain training motivation. In this regard, according to the image processing system 11 of the present embodiment, it is possible to cause the stereoscopic view image related to the tropical sea to be displayed on the wall surfaces of the water tank 100 toward the inside of the water storage space as illustrated in FIG. 1. Thus, the user 2 who is swimming in the water storage space can view the stereoscopic images such as coral reefs or fish through the goggles 30. Thus, the user 2 can experience a feeling of swimming together with fish in the sea in which coral reefs flourish. Thus, the user can maintain motivation for continuing swimming without getting bored for a long time.

Further, using the image processing system 11 according to the present embodiment, for example, it is possible to improve training efficiency of swimming. In the past, in order to improve a swimming form, it was necessary to imitate the form of a professional. However, it was difficult to look at and imitate the form of the professional. In this regard, according to the image processing system 11 of the present embodiment, for example, it is possible to cause an image related to the form of a professional to be displayed on the bottom surface 102 of the water tank 100.

Figure 4:
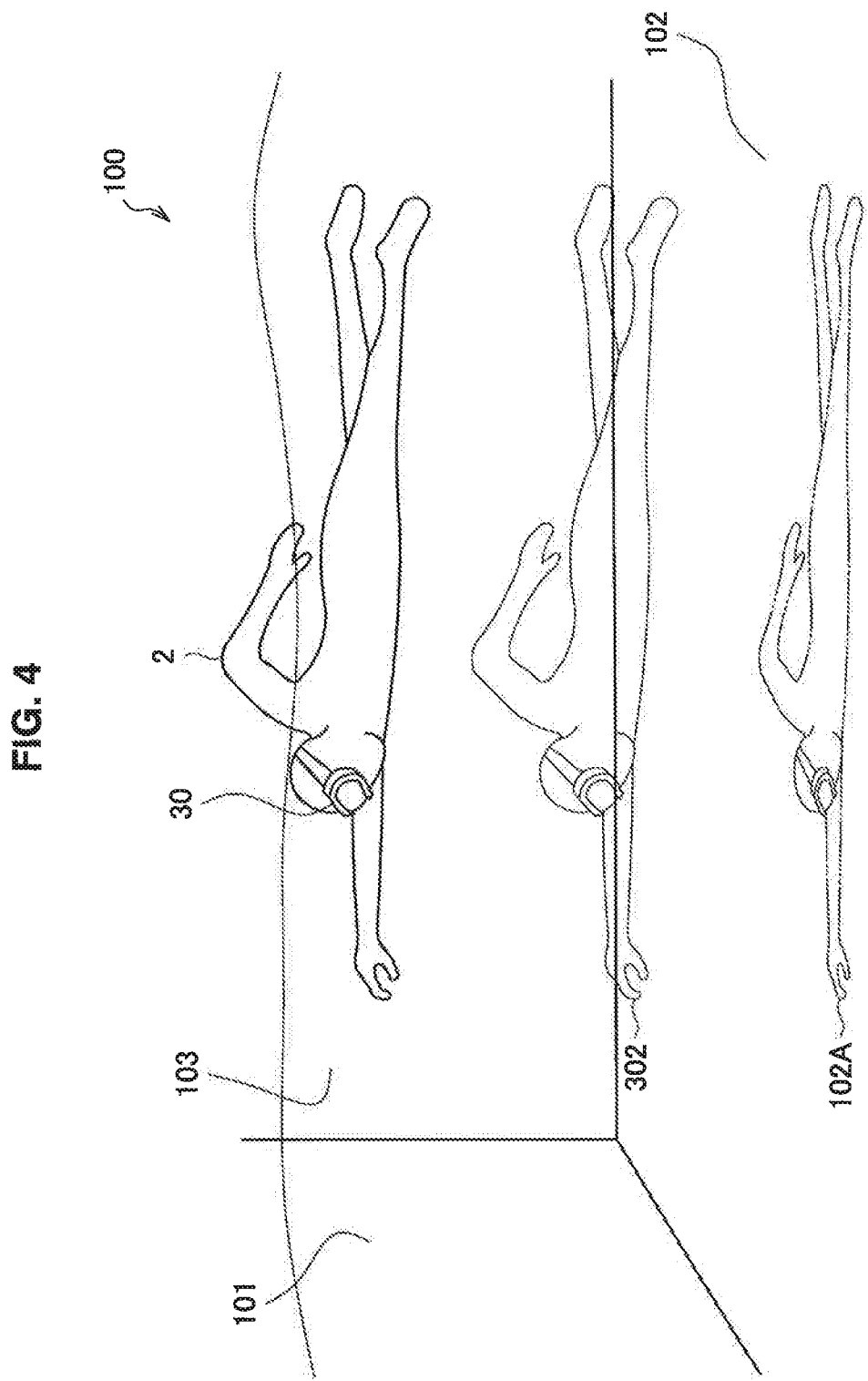
FIG. 4 is a diagram illustrating an example of the image processing system according to the embodiment.

FIG. 4 is a diagram illustrating an example of the image processing system 11 according to the first embodiment of the present disclosure. Referring to FIG. 4, a stereoscopic view image 102A related to the form of a professional is displayed on the bottom surface 102 of the water tank 100. The user 2 who is swimming in the water storage space can view a stereoscopic image 302 of the form of a professional expressed by the stereoscopic view image 102A through the goggles 30. Thus, the user 2 can efficiently perform training related to improvement in a swimming form.

The stereoscopic view image displayed on the wall surfaces of the water tank 100 is not limited to this example. For example, using a stereoscopic view image of space, a flying video, or the like, the user 2 can experience a feeling of a spacewalk, levitation, or the like. The stereoscopic view image is generated through the image generating unit 220 using an omnidirectional image acquired using an omnidirectional camera, an image generated using an OpenGL utility toolkit (GLUT) library of OpenGL, or the like.

[1.5. Modified Example]

Figure 5:
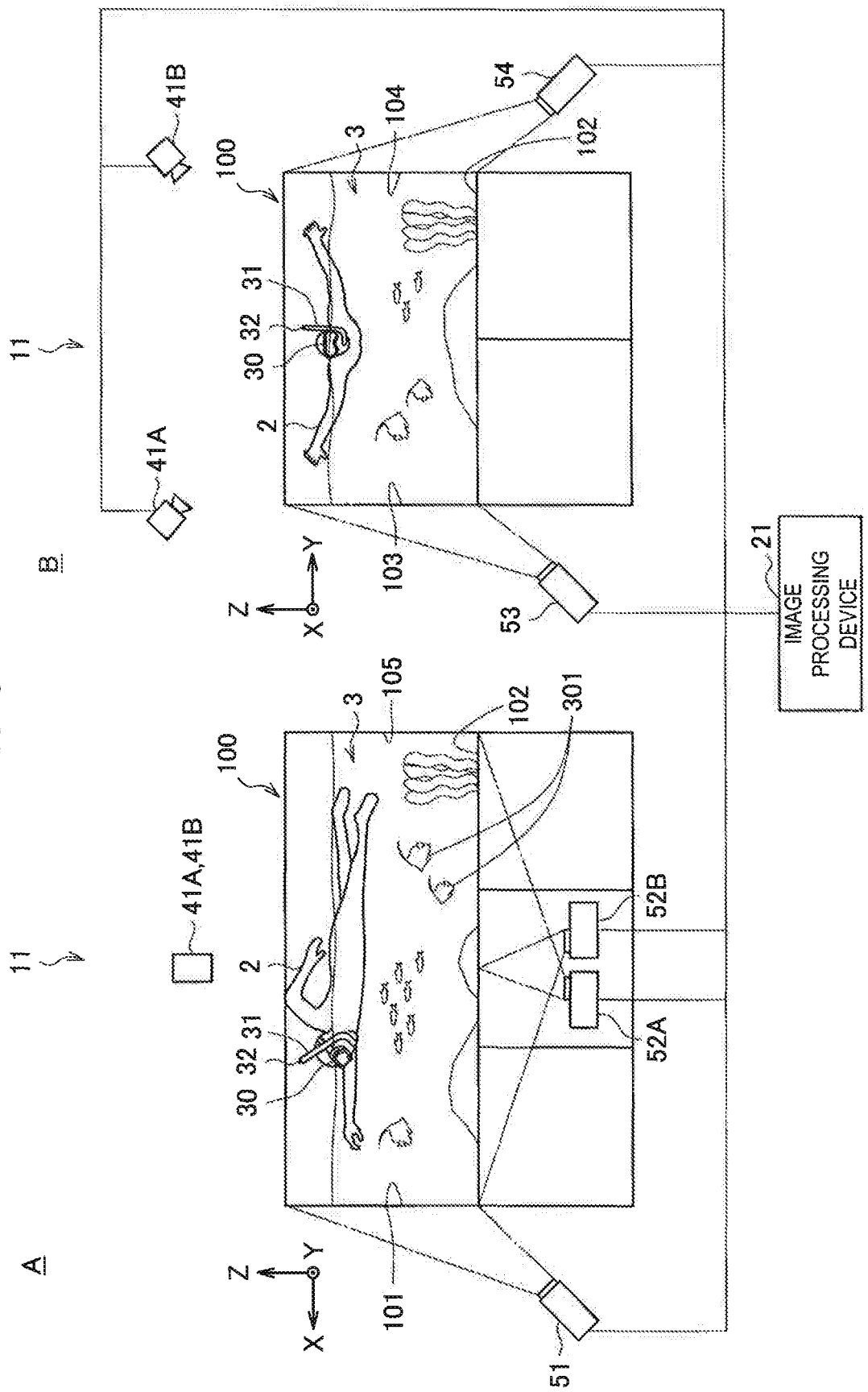
FIG. 5 is a diagram illustrating an overview of a configuration of an image processing system according to a modified example of the embodiment.

Next, an example in which position information used for estimating the point-of-view position of the user 2 is acquired through a marker attached to a snorkel worn by the user 2 will be described as an image processing system 11 according to a modified example of the present embodiment. FIG. 5 is a diagram illustrating an overview of a configuration of an image processing system 11 according to the modified example of the first embodiment of the present disclosure. As illustrated in FIG. 5, the image processing system 11 of the present modified example includes an image processing device 21, goggles 30, a snorkel 31, a marker 32, imaging devices 41A and 41B, projecting devices 51 to 54 (50), and a water tank 100. The image processing device 21 is connected with the imaging devices 41A and 41B, and the projecting devices 51 to 54 via various kinds of wired or wireless networks. The image processing device 21 is connected with the goggles 30, for example, through wireless communication of Bluetooth (registered trademark) or the like. A of FIG. 5 illustrates a configuration of the image processing system 11 of the present modified example viewed in the Y-axis direction, and A of FIG. 5 illustrates a configuration of the image processing system 11 of the present modified example viewed in the X-axis direction. The configurations of A and B of FIG. 5 are the same configuration. The remaining components except the snorkel 31 and the marker 32 are the same as those in the present embodiment, and thus description is omitted.

(Snorkel and Marker)

The snorkel 31 is worn on the head of the user 2. For example, the snorkel 31 has substantially a cylindrical shape whose inside is hollow. One end of the snorkel 31 is put into a mouth of the user 2, and the other end is exposed above the surface of the water 3. The snorkel 31 may be mounted on the goggles 30 to be stably held on the head of the user 2. The marker 32 is attached to the other end of the snorkel 31. The marker 32 may be a light emission source such as an infrared LED, a characteristic print pattern, or the like. When the marker is attached to the other end of the snorkel 31, the imaging devices 41A and 41B which will be described later recognize the position of the marker 32. Thus, it is possible to estimate the position of the user wearing the snorkel 31.

(Imaging Device)

In the present modified example, the imaging devices 41A and 41B are installed above the water tank 100 as illustrated in FIG. 5. More specifically, as illustrated in B of FIG. 5, the imaging devices 41A and 41B are installed above the water tank in parallel to the Y-axis direction so that the imaging devices 41A and 41B are bilaterally symmetric with respect to the X axis at the same height. The image directions of the imaging devices 41A and 41B are a direction of the inside of the water tank 100. Thus, it is possible to image the snorkel 31 worn by the user 2 without omission regardless of the position of the user 2 who is swimming in the water storage space. Further, in the present modified example, the number of imaging devices is 2, but the number of imaging devices is not particularly limited.

The imaging devices 41A and 41B recognize the marker 32 attached to the snorkel 31. Using the recognition result, the position estimating unit 210 can estimate the position of the user 2. Here, the marker 32 attached to the snorkel 31 is positioned above the surface of the water 3 stored in the water tank 100, and the imaging devices 41A and 41B are installed above the water tank 100. According to this configuration, the imaging devices 41A and 41B recognize the marker 32 from outside of the water 3. Thus, since the imaging devices 41A and 41B can recognize the marker 32 with no influence of attenuation or scattering of light by the water 3, it is possible to extend a range in which the marker 32 is recognized, and the accuracy of recognition of the marker 32 is improved. Thus, it is possible to display an appropriate stereoscopic view image to the user 2.

Further, according to the present embodiment, the imaging device 40 recognizes the marker attached to the goggles 30 or the like and estimates the point-of-view position of the user 2 based on the recognition result, but the present technology is not limited to this example. For example, instead of the marker, a sensor for acquiring the position information of the user 2 may be worn by the user. The sensor may be, for example, a magnetic sensor or the like. Preferably, the sensor is a sensor whose accuracy does not change according to a physical property of a medium such as the water 3 stored in the water tank 100 or the like (for example, magnetic permeability or the like). Further, the position information of the user 2 may be acquired based on a combination of a plurality of sensors or imaging devices or the like.

Further, according to the present embodiment, the stereoscopic view image is projected through the projecting device 50 and displayed on the wall surfaces of the water tank 100, but the present technology is not limited to this example. For example, a display device may be installed on the wall surfaces of the water tank 100. More specifically, the display device may be installed inside or outside each of the wall surfaces in a direction in which the image is displayed toward the water storage space. For example, the display device may be a display device such as a liquid crystal display (LCD), an organic light-emitting diode (OLED) display, a plasma display panel (PDP), a cathode ray tube (CRT), or the like.

2. Second Embodiment

Next, an image processing system 12 according to a second embodiment of the present disclosure will be described. The image processing system 12 according to the present embodiment further includes a water flow generating device that causes the water stored in the water tank 100 to flow. Through this configuration, the user 2 can continuously swim while staying substantially at the same position in the water storage space. Further, the user 2 can experience the VR space that changes according to his/her swimming.

[2.1. Exemplary Configuration]

Figure 6:
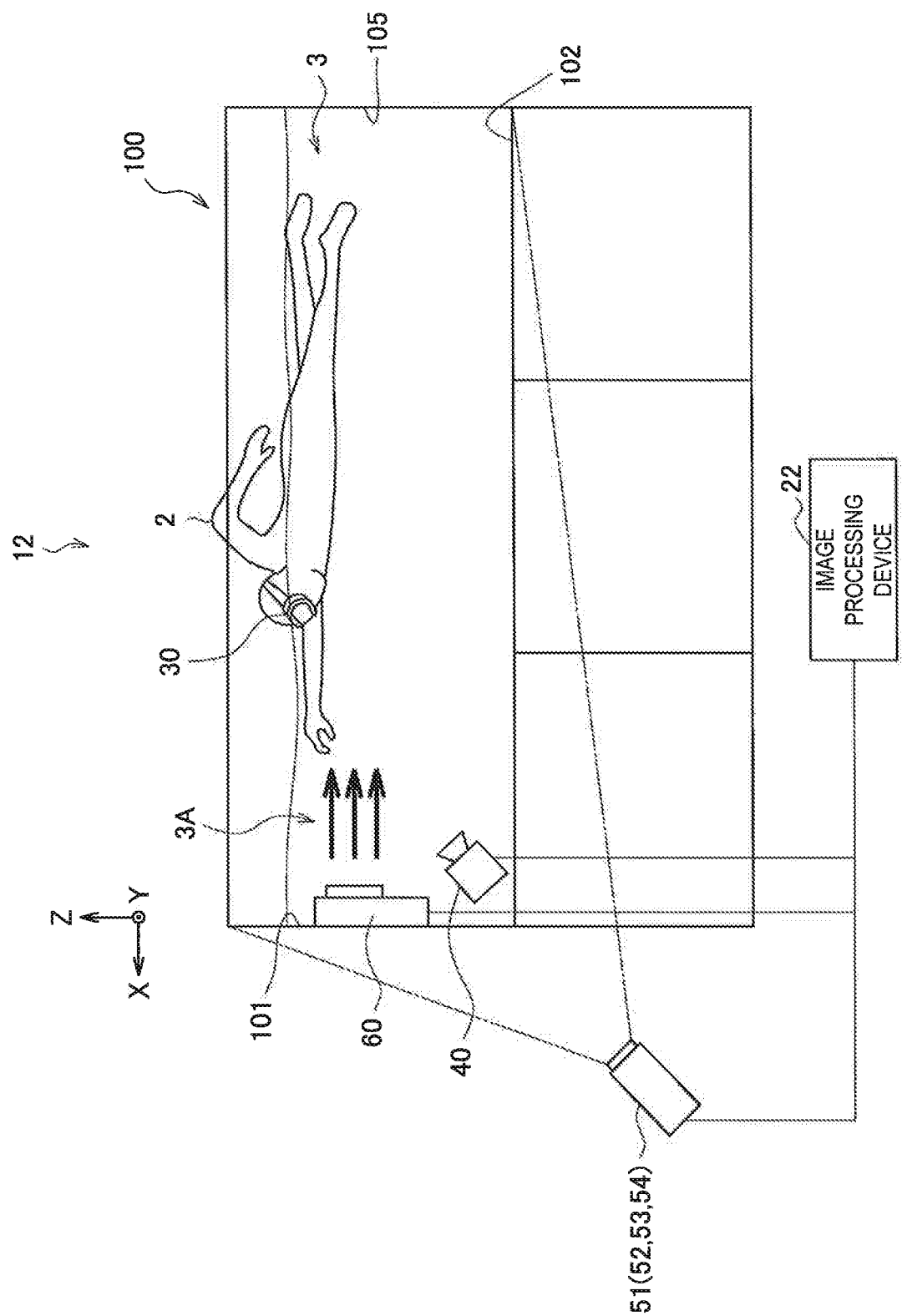
FIG. 6 is a diagram illustrating an overview of a configuration of an image processing system according to a second embodiment of the present disclosure.

FIG. 6 is a diagram illustrating an overview of a configuration of the image processing system 12 according to the second embodiment of the present disclosure. As illustrated in FIG. 6, the image processing system 12 includes an image processing device 22, goggles 30, an imaging device 40, projecting devices 51 to 54, a water flow generating device 60, and a water tank 100. Internal functional components of the image processing device 22 and components other than the water flow generating device 60 are the same as those in the image processing system 11 according to the first embodiment, and thus description is omitted.

(Water Flow Generating Device)

The water flow generating device 60 is a device that generates a water flow in the water 3 stored in the water tank 100. In the example illustrated in FIG. 6, the water flow generating device 60 supplies a water flow 3A in a direction opposite to a direction in which the user 2 is swimming in the water storage space (an X direction) in a direction in which the user 2 is located. A method of generating the water flow 3A through the water flow generating device 60 is not particularly limited. For example, the water flow generating device 60 may generate the water flow 3A by sucking the water 3 through a suction opening (not illustrated) using a pump, a screw, a paddle, or the like installed therein and ejecting the water 3 through an ejection opening by applying driving force to the sucked water. Further, in the example illustrated in FIG. 6, the water flow generating device 60 is installed in the side surface 101 of the water tank 100, but an installation position is not particularly limited. Furthermore, in the present embodiment, the water flow generating device 60 is installed separately from the water tank 100, but the water flow generating device 60 may be configured integrally with the water tank 100.

The water flow generating device 60 is connected with the image processing device 22 via various kinds of wired or wireless networks. The water flow generating device 60 adjusts a flow velocity of the water flow 3A according to a signal output from the image processing device 22. For example, the water flow generating device 60 sets a flow velocity calculated by the image processing device 22 as the flow velocity of the water flow 3A. For example, when the user 2 is pushed back by the water flow 3A, the image processing device 22 outputs a control signal for decreasing the flow velocity of the water flow 3A to the water flow generating device 60, and the water flow generating device 60 performs an adjustment such that the flow velocity of the water flow 3A is decreased. On the other hand, when the user 2 moves forward against the water flow 3A, the image processing device 22 outputs a control signal for increasing the flow velocity of the water flow 3A to the water flow generating device 60, and the water flow generating device 60 performs an adjustment such that the flow velocity of the water flow 3A is increased. Accordingly, the water flow generating device 60 can adjust the flow velocity so that the user 2 stays at substantially the same position.

Figure 7:
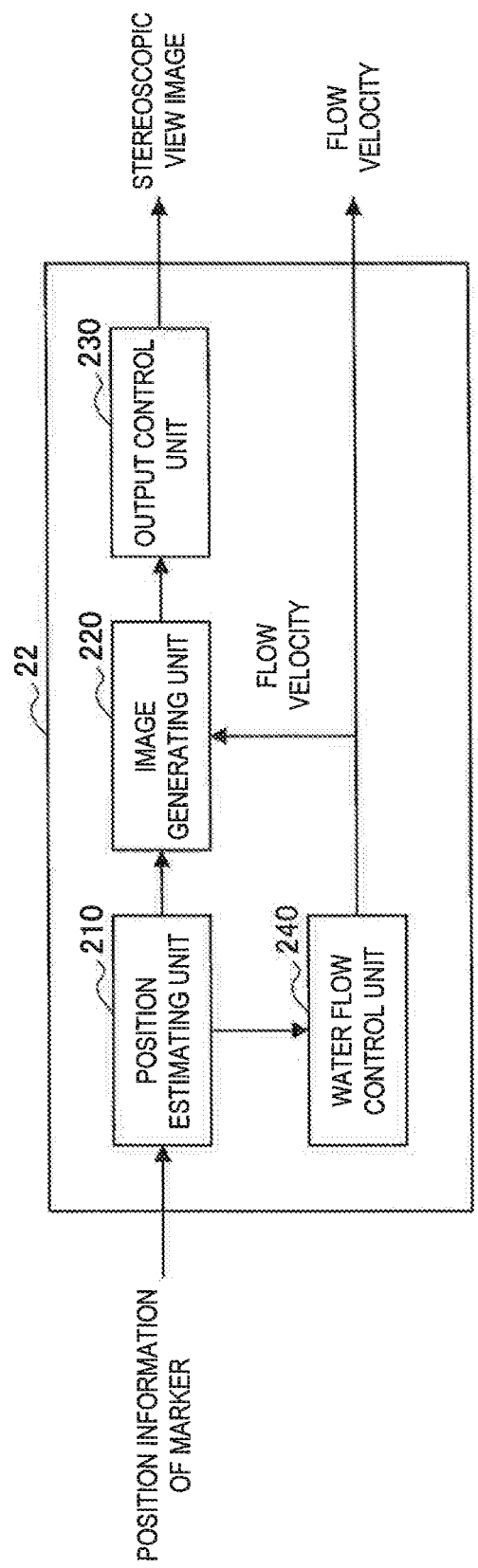
FIG. 7 is a block diagram illustrating an exemplary functional configuration of an image processing device according to the embodiment.

FIG. 7 is a block diagram illustrating an exemplary functional configuration of the image processing device 22 according to the second embodiment of the present disclosure. Referring to FIG. 7, the image processing device 22 includes a position estimating unit 210, an image generating unit 220, an output control unit 230, and a water flow control unit 240. The position estimating unit 210 and the output control unit 230 according to the present embodiment are the same as the position estimating unit 210 and the output control unit 230 included in the image processing device 21 according to the first embodiment, and thus a detailed description is omitted.

(Water Flow Control Unit)

The water flow control unit 240 has a function of controlling the flow velocity of the water flow 3A generated by the water flow generating device 60. In other words, the water flow generating device 60 adjusts the flow velocity of the water flow 3A based on control details related to the flow velocity acquired by the water flow control unit 240.

The water flow control unit 240 controls the flow velocity based on, for example, a change in the point-of-view position of the user 2 who is swimming in the water storage space. Specifically, the change in the point-of-view position is a change in the point-of-view position in the flow direction of the water flow 3A. For example, the position estimating unit 210 calculates a difference between the point-of-view position of the user 2 at one previous time and the point-of-view position at a current time as an amount of change in the point-of-view position. For example, when the user 2 is pushed back by the water flow 3A, the point-of-view position of the user 2 changes in the water flow direction. In this case, the position estimating unit 210 calculates a negative value as the amount of change in the point-of-view position (which has a positive value in the X-axis direction). Thus, the water flow control unit 240 performs control such that the flow velocity of the water flow 3A is decreased in order to cause the amount of change in the point-of-view position to approximate zero. On the other hand, when the user 2 pushes back the water flow 3A, the point-of-view position of the user 2 changes in a direction opposite to the water flow 3A. In this case, the position estimating unit 210 calculates a positive value as the amount of change in the point-of-view position. Thus, the water flow control unit 240 performs control such that the flow velocity of the water flow 3A is increased to cause the amount of change in the point-of-view position to approximate zero. Accordingly, the user 2 can swim while continuously staying at the same position. Further, the water flow control unit 240 outputs the control details related to the flow velocity to the image generating unit 220.

The image generating unit 220 according to the present embodiment generates the stereoscopic view image according to the point-of-view position of the user 2 estimated by the position estimating unit 210 and a virtual travel distance of the user 2. Here, in the present embodiment, the virtual travel distance is a virtual travel distance which is estimated according to an amount of change in the point-of-view position of the user 2 and the control details related to the flow velocity acquired by the water flow control unit 240 and assumed to be moved by the user 2 under normal circumstances. The virtual travel distance may be, for example, a value obtained by adding the amount of change in the point-of-view position of the user 2 which is changed in the water flow direction before and after a unit time to a value obtained by multiplying the unit time by the flow velocity of the water flow 3A.

[2.2. Exemplary Operation]

Figure 8:
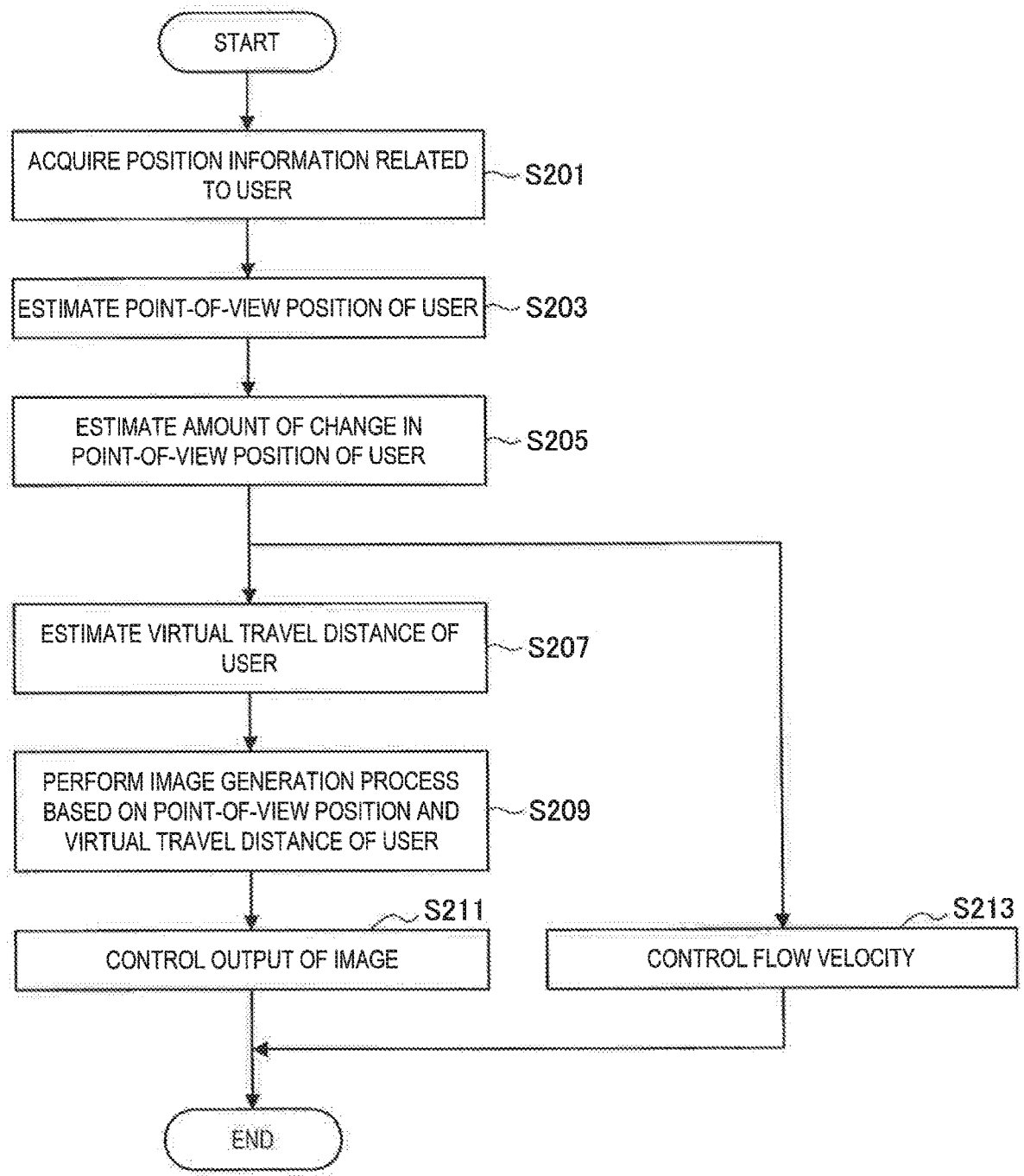
FIG. 8 is a flowchart illustrating an operation of the image processing device according to the embodiment.

FIG. 8 is a flowchart illustrating an operation of the image processing device 22 according to the second embodiment of the present disclosure. Referring to FIG. 8, first, the image processing device 22 acquires the position information related to the user (S201). Specifically, the imaging device 40 recognizes the position of the marker attached to the goggles 30 worn by the user 2, and the position estimating unit 210 acquires position information of the recognized marker. The position information of the marker may be acquired using the communication with the imaging device 40 through the communication device included in the image processing device 22.

Then, the image processing device 22 estimates the position of the eye of the user 2 based on the position information of the marker (S203). Specifically, the position estimating unit 210 estimates the position of the eye of the user 2 as the point-of-view position. Further, the image processing device 22 estimates the amount of change in the point-of-view position of the user 2 (S205). Specifically, the position estimating unit 210 calculates the amount of change between the point-of-view positions at one previous time and a current time. Then, the image processing device 22 estimates the virtual travel distance of the user 2 (S207). Specifically, the image generating unit 220 estimates the virtual travel distance of the user 2 based on the amount of change in the point-of-view position calculated by the position estimating unit 210 and the flow velocity of the water flow 3A output from the water flow control unit 240.

Then, the image processing device 22 generates the stereoscopic view image according to the point-of-view position of the user 2 and the virtual travel distance (S209). Specifically, the image generating unit 220 generates the stereoscopic view image according to the point-of-view position of the user 2 estimated by the position estimating unit 210 and the virtual travel distance.

Then, the image processing device 22 performs control such that the stereoscopic view image is output (S211). Specifically, the output control unit 230 performs control such that the stereoscopic view images generated by the image generating unit 220 are output to the projecting device 50. Further, the image processing device 22 controls the flow velocity of the water flow 3A of the water flow generating device 60 (S213). Specifically, the water flow control unit 240 calculates the amount of change between the point-of-view positions which are estimated by the position estimating unit 210 at one previous time and at a current time, and controls the flow velocity of the water flow 3A based on a calculation result.

The image processing device 22 repeatedly performs steps S201 to S213.

[2.3. Effects and Supplements]

As illustrated in FIG. 8, according to the image processing system 12 of the present embodiment, the image processing device 22 generates the stereoscopic view image according to the virtual travel distance of the user 2 while fixing the position of the user 2 through the water flow 3A generated by the water flow generating device 60. For example, the image processing device 22 may generate the stereoscopic view image expressing the state in which a surrounding environment moves relatively according to the virtual travel distance of the user 2. Thus, the user 2 can experience a feeling of swimming a distance corresponding to the virtual travel distance.

Through this configuration, for example, it is possible to experience a feeling of moving while floating in the VR space. As an example, the image generating unit 220 may generate the stereoscopic view image so that the user can experience a feeling of moving in the direction opposite to the flow direction of the water flow 3A according to the virtual travel distance of the user 2. More specifically, when the stereoscopic view image is an image expressing an environment near the bottom of the sea in the tropical region, the image generating unit 220 may generate a stereoscopic view image in which rocks, coral reefs, or the like in the bottom of the sea move relatively toward the rear of the user 2 according to the virtual travel distance of the user 2. Accordingly, the user 2 can experience a feeling of swimming and actually moving forward along the bottom of the sea.

Figure 9:
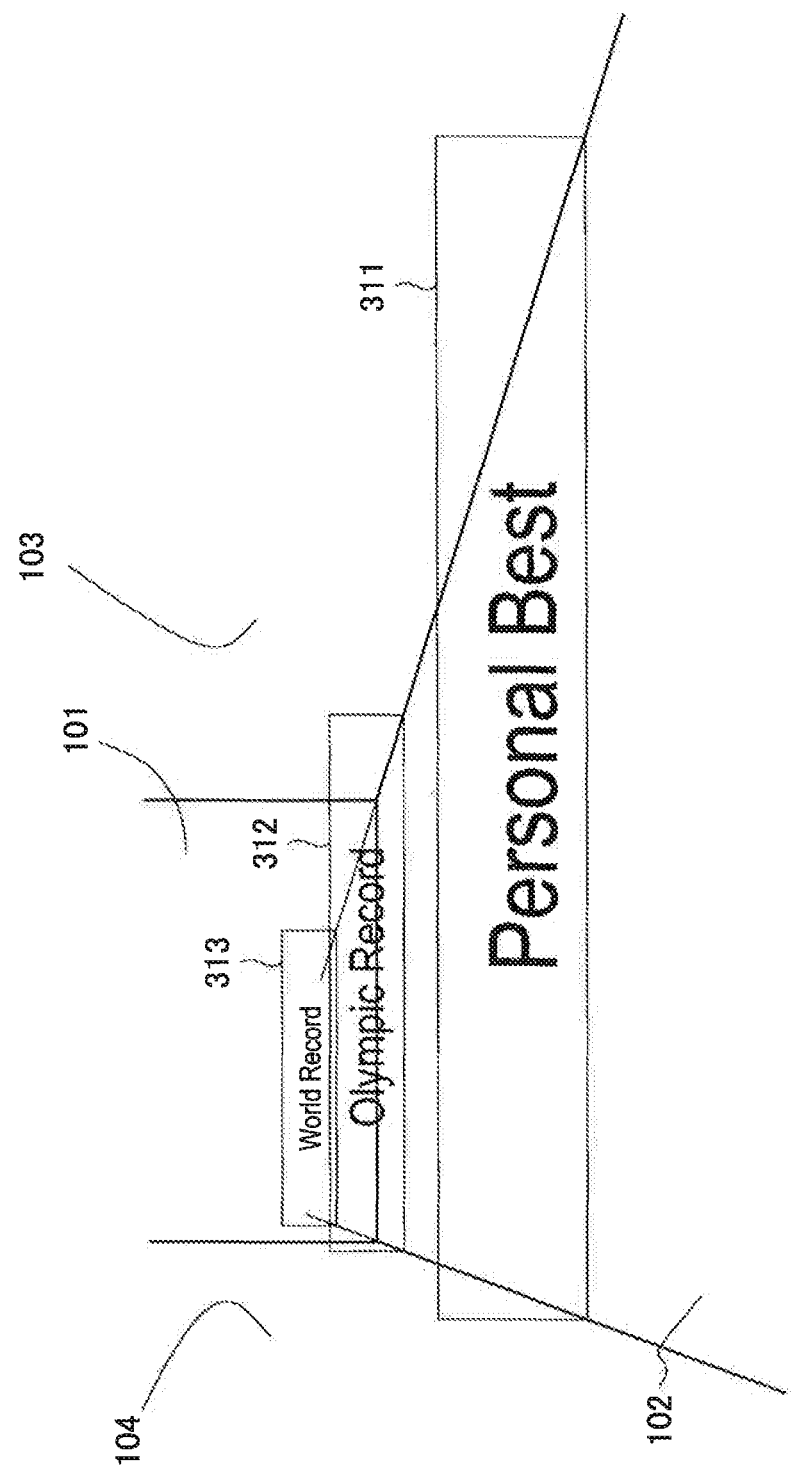
FIG. 9 is a diagram illustrating an example of the image processing system according to the embodiment.

Further, using the image processing system 12 according to the present embodiment, for example, swimming training can be more effectively performed. FIG. 9 is a diagram illustrating an example of the image processing system 12 according to the second embodiment of the present disclosure. Referring to FIG. 9, stereoscopic images 311 to 313 appear in the water tank 100. The stereoscopic images 311 to 313 are stereoscopic images expressed through the stereoscopic view images displayed on the side surfaces 101, 103, and 104 and the bottom surface 102. The stereoscopic images are images indicating record lines in swimming, and when the user 2 is at a standstill, the stereoscopic images are expressed to move towards the side surface 101. For example, the stereoscopic image 311 is a record line indicating a personal record of the user 2, and thus "Personal Rest" is written. Similarly, the stereoscopic image 312 is a record line indicating an official Olympic record, and thus "Olympic Record" is written. Further, the stereoscopic image 313 is a record line indicating a world record, and thus "World Record" is written.

When the user 2 is swimming toward the side surface 101, the positions of the stereoscopic images 311 to 313 change according to the virtual travel distance of the user 2. For example, when the user 2 is swimming at a pace exceeding the record corresponding to the stereoscopic image 311, the stereoscopic image 311 is expressed to move in a direction opposite to a swimming direction of the user 2. On the other hand, when the user 2 is swimming at a pace lower than the record corresponding to the stereoscopic image 313, the stereoscopic image 313 is expressed to move in the swimming direction of the user 2. In the present example, the record lines are expressed through the stereoscopic images, and thus the user 2 can intuitively understand a degree to which he/she is behind (or ahead of) each record. Accordingly, the user 2 can adjust a swimming speed or pacing more easily.

3. Third Embodiment

Next, an image processing system 13 according to the third embodiment of the present disclosure will be described. The image processing system 13 according to the present embodiment further includes a fixing member (an acting force measuring device 70 and a rope 71) for fixing the user 2 to substantially the same position. Through this configuration, the user 2 can continuously swim while staying at substantially the same position in the water storage space. Further, the user 2 can experience the VR space that changes according to his/her swimming.

[3.1. Exemplary Configuration]

Figure 10:
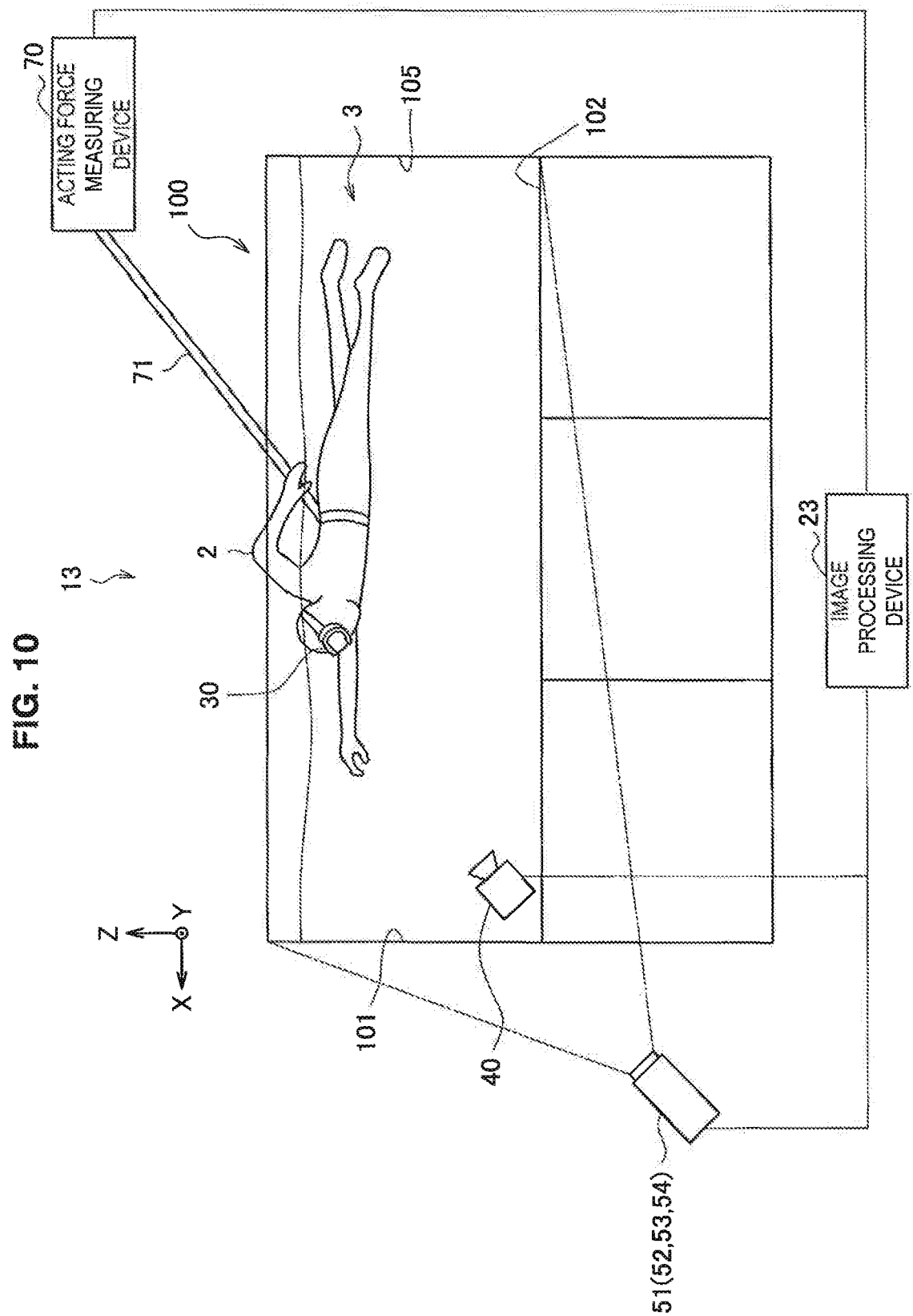
FIG. 10 is a diagram illustrating an overview of a configuration of an image processing system according to a third embodiment of the present disclosure.

FIG. 10 is a diagram illustrating an overview of a configuration of the image processing system 13 according to the third embodiment of the present disclosure. As illustrated in FIG. 10, the image processing system 13 includes an image processing device 22, goggles 30, an imaging device 40, projecting devices 51 to 54, an acting force measuring device 70, a rope 71, and a water tank 100. Internal functional components of the image processing device 23 and components other than the acting force measuring device 70 and the rope 71 are the same as those in the image processing system 11 according to the first embodiment, and thus description is omitted.

(Acting Force Measuring Device and Rope)

The acting force measuring device 70 is a device that measures tensile force applied to the rope 71. In the example illustrated in FIG. 10, the acting force measuring device 70 measures the tensile force of the rope 71 which is pulled by the user 2 who is swimming in the water storage space. For example, one end of the rope 71 is tied on a part of the body of the user 2 (for example, a belt worn on the waist of the user 2), and the other end of the rope 71 is fixed to a probe included in the acting force measuring device 70. Through this configuration, when the user 2 is swimming in an X direction in FIG. 10, the user 2 stays at substantially the same position due to reactive force of the tensile force applied to the rope 71, and the acting force measuring device 70 measures a magnitude of the tensile force which is applied from the user 2 to the rope 71. Thus, it is possible to measure a magnitude of force applied in the swimming direction of the user 2.

The acting force measuring device 70 is connected with the image processing device 23 via various kinds of wired or wireless networks. The acting force measuring device 70 outputs a measurement result related to the tensile force which is applied from the user 2 to the rope 71 to the image processing device 23. The image processing device 23 generates the stereoscopic view image according to the measurement result related to the tensile force acquired by the acting force measuring device 70. Specifically, the image processing device 23 estimates the virtual travel distance of the user 2 based on the magnitude and the direction of the tensile force acquired by the acting force measuring device 70, and generates the stereoscopic view image according to the virtual travel distance. Accordingly, the user 2 can view the stereoscopic image that changes with his/her swimming.

In the example illustrated in FIG. 10, the rope 71 to which force is applied and the acting force measuring device 70 that measures force applied to the rope 71 are separately installed, but the present technology is not limited to this example. For example, the acting force measuring device 70 may be configured integrally with the rope 71. More specifically, a probe or a spring of a strain gauge may be installed in the rope 71, and a measurement result related to the tensile force which is measured by it may be acquired by the image processing device 23.

Figure 11:
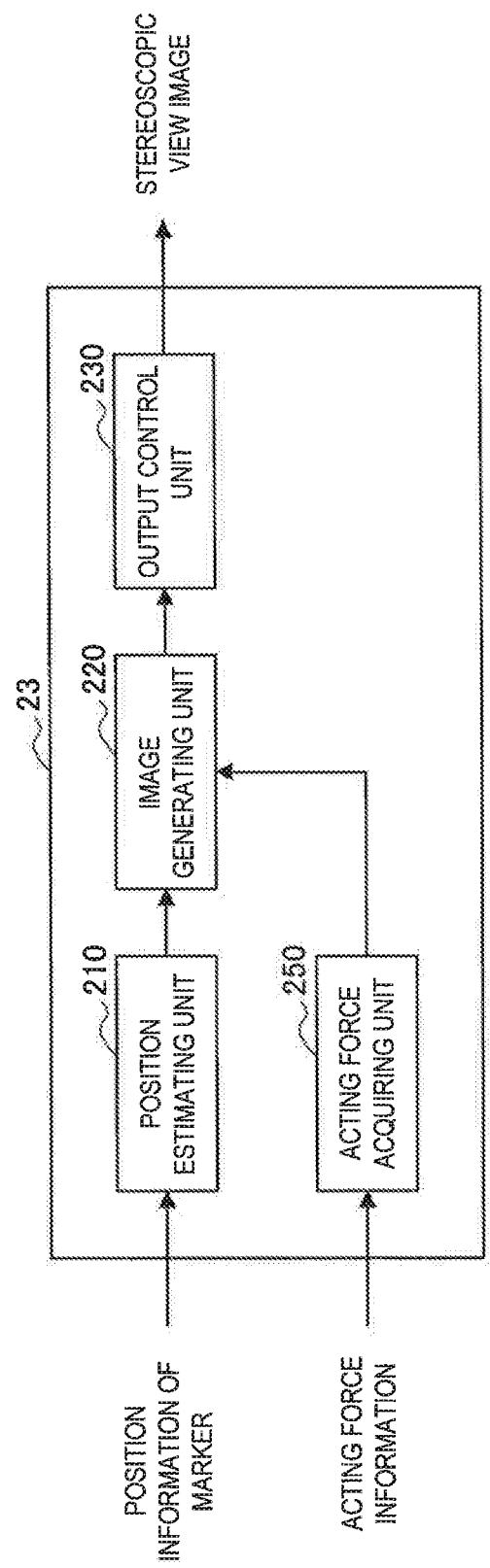
FIG. 11 is a block diagram illustrating an exemplary functional configuration of an image processing device according to the embodiment.

FIG. 11 is a block diagram illustrating an exemplary functional configuration of the image processing device 23 according to the third embodiment of the present disclosure. Referring to FIG. 11, the image processing device 23 includes a position estimating unit 210, an image generating unit 220, an output control unit 230, and an acting force acquiring unit 250. The position estimating unit 210 and the output control unit 230 according to the present embodiment are the same as the position estimating unit 210 and the output control unit 230 included in the image processing device 21 according to the first embodiment, and thus detailed description is omitted.

(Acting Force Acquiring Unit)

The acting force acquiring unit 250 has a function of acquiring information related to force measured by the acting force measuring device 70. For example, the information related to the force may be the magnitude and the direction of the tensile force which is applied from the user 2 to the rope 71 and measured by the acting force measuring device 70. The acting force acquiring unit 250 outputs the information related to the force to the image generating unit 220.

The image generating unit 220 according to the present embodiment generates the stereoscopic view image according to the point-of-view position of the user 2 estimated by the position estimating unit 210 and the virtual travel distance of the user 2. Here, in the present embodiment, the virtual travel distance is a virtual travel distance which is estimated according to the information related to the force acquired by the acting force acquiring unit 250 and assumed to be moved by the user 2 under normal circumstances. The virtual travel distance may be, for example, a value calculated based on the magnitude of the tensile force in the swimming direction of the user 2.

[3.2. Exemplary Operation]

Figure 12:
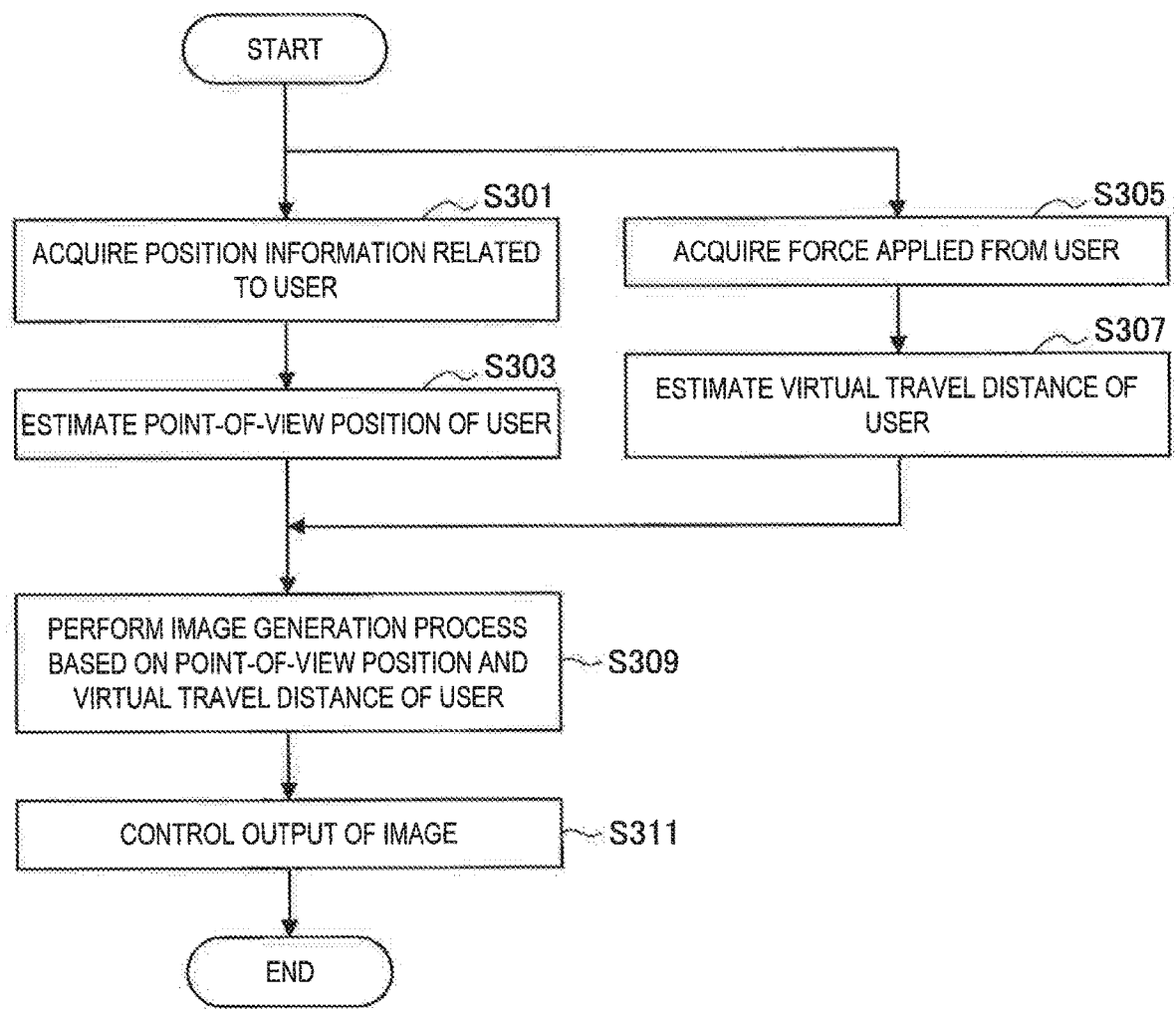
FIG. 12 is a flowchart illustrating an operation of the image processing device according to the embodiment.

FIG. 12 is a flowchart illustrating an operation of the image processing device 23 according to the third embodiment of the present disclosure. Referring to FIG. 12, first, the image processing device 23 acquires the position information related to the user (S301). The imaging device 40 recognizes the position of the marker attached to the goggles 30 worn by the user 2, and the position estimating unit 210 acquires position information of the recognized marker. The position information of the marker may be acquired using communication with the imaging device 40 through a communication device with which the image processing device 23 is equipped.

Then, the image processing device 23 estimates the position of the eye of the user 2 based on the position information of the marker (S303). Specifically, the position estimating unit 210 estimates the position of the eye of the user 2 as the point-of-view position. Further, the image processing device 22 acquires the information related to the force which is applied from the user 2 to the rope 71 and measured by the acting force measuring device 70 (S305). Specifically, the acting force acquiring unit 250 acquires, for example, information related to the magnitude and the direction of the tensile force applied by the user 2. Then, the image processing device 22 estimates the virtual travel distance of the user 2 (S307). Specifically, the image generating unit 220 estimates the virtual travel distance of the user 2 based on the magnitude and the direction of the tensile force acquired by the acting force acquiring unit 250.

Then, the image processing device 23 generates the stereoscopic view image according to the point-of-view position of the user 2 and the virtual travel distance (S309). Specifically, the image generating unit 220 generates the stereoscopic view image according to the point-of-view position of the user 2 estimated by the position estimating unit 210 and the virtual travel distance.

Then, the image processing device 23 performs control such that the stereoscopic view image is output (S311). Specifically, the output control unit 230 performs control such that the stereoscopic view images generated by the image generating unit 220 are output to the projecting device 50.

The image processing device 23 repeatedly performs steps S301 to S311.

[3.3. Effects and Supplements]

As illustrated in FIG. 10, according to the image processing system 13 of the present embodiment, the image processing device 23 generates the stereoscopic view image according to the virtual travel distance of the user 2 calculated based on, for example, the magnitude of force measured by the acting force measuring device 70 while fixing the position of the user 2 through the rope 71. Accordingly, the stereoscopic image in which a motion of the user 2 swimming is reflected is presented to the user 2. Thus, the user 2 can view the stereoscopic image that changes with his/her swimming. Further, according to the present embodiment, it is possible to implement the image processing system which is implemented through the second embodiment without using the water flow generating device.

[3.4. Modified Example]

Figure 13:
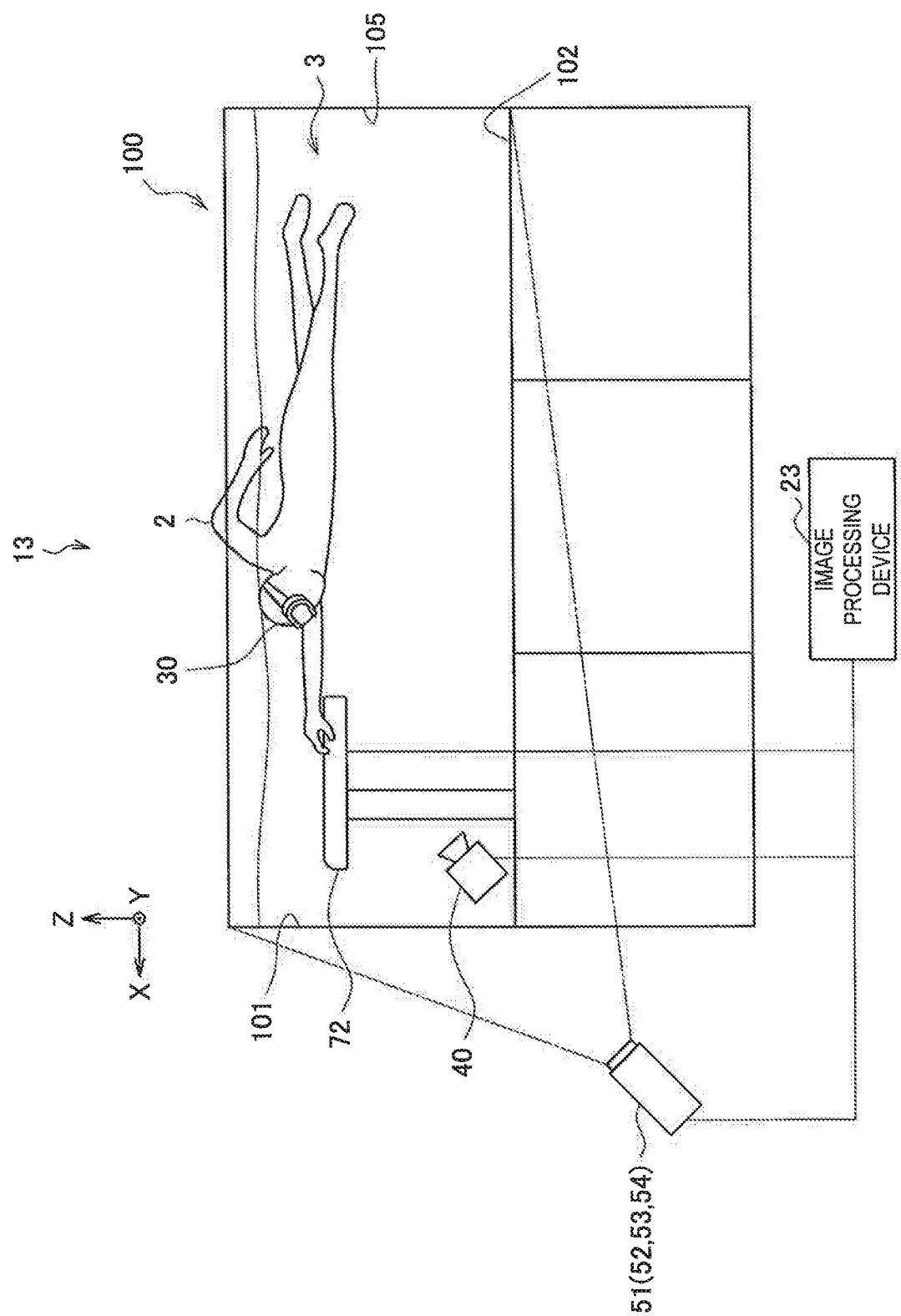
FIG. 13 is a diagram illustrating an overview of a configuration of an image processing system according to a modified example of the embodiment.

A configuration of acquiring the information related to the force applied by the user 2 through a device used in the water storage space to estimate the virtual travel distance of the user 2 will be described as an image processing system 13 according to a modified example of the present embodiment. FIG. 13 is a diagram illustrating an overview of a configuration of the image processing system 13 according to a modified example of the third embodiment of the present disclosure. Referring to FIG. 13, in the image processing system 13 according to the present modified example, an acting force measuring plate 72 is provided instead of the acting force measuring device 70 and the rope 71.

(Acting Force Measuring Plate)

The acting force measuring plate 72 is a device that is fixedly installed in the water tank 100. For example, the acting force measuring plate 72 may be installed to be fixed to any one of the wall surfaces of the water tank 100. In the present modified example, the acting force measuring plate 72 is fixedly installed through a beam extending from the bottom surface 102. A shape of the acting force measuring plate 72 is not particularly limited. In the present modified example, the acting force measuring plate 72 has a plate-like shape. The user 2 can continuously stay at substantially the same position by swimming while grasping the acting force measuring plate 72.

The acting force measuring plate 72 measures force which is applied by a motion such as the user 2 swimming. A method of measuring force through the acting force measuring plate 72 is not particularly limited. Further, the acting force measuring plate 72 is connected with the image processing device 23 via various kinds of wired or wireless networks. The acting force measuring plate 72 outputs a measurement result related to the force applied by the user 2 to the image processing device 23. The image processing device 23 generates the stereoscopic view image according to the measurement result related to the force acquired by the acting force measuring plate 72. Specifically, the image processing device 23 estimates the virtual travel distance of the user 2 based on the magnitude and the direction of the force acquired by the acting force measuring plate 72, and generates the stereoscopic view image according to the virtual travel distance. Accordingly, the user 2 can view the stereoscopic image that changes with his/her swimming.

The acting force measuring plate 72 according to the present modified example is installed to be fixed to the water tank 100, but the present technology is not limited to this example. For example, the acting force measuring plate 72 may be configured to autonomously move in the water without being fixed to the water tank 100. Accordingly, the user 2 can experience the VR space that changes with his/her swimming without staying at the same position in the water storage space.

4. Fourth Embodiment

Then, an image processing system 14 according to the fourth embodiment of the present disclosure will be described. The image processing system 14 according to the present embodiment further includes a water level gauge 80 that measures a water level of the water 3 stored in the water tank 100. Through this configuration, the user 2 can experience different VR spaces above and below the surface of the water.

[4.1. Exemplary Configuration]

Figure 14:
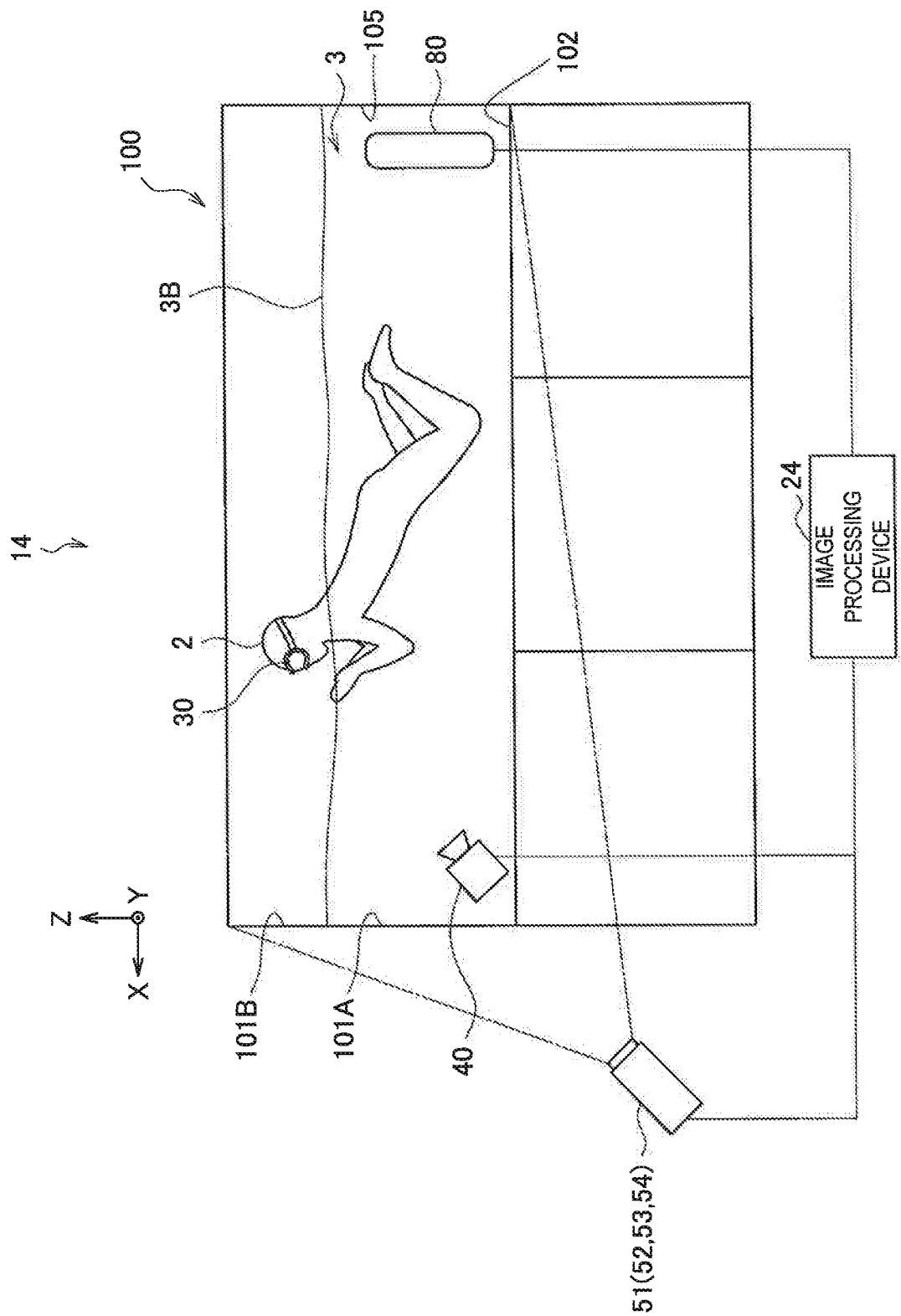
FIG. 14 is a diagram illustrating an overview of a configuration of an image processing system according to a fourth embodiment of the present disclosure.

FIG. 14 is a diagram illustrating an overview of a configuration of the image processing system 14 according to the fourth embodiment of the present disclosure. As illustrated in FIG. 14, the image processing system 14 includes an image processing device 24, goggles 30, an imaging device 40, projecting devices 51 to 54, a water level gauge 80, and a water tank 100. Internal functional components of the image processing device 22 and components other than the water level gauge 80 are the same as those in the image processing system 11 according to the first embodiment, and thus description is omitted.

(Water Level Gauge)

The water level gauge 80 is a device that measures the water level of the water 3 stored in the water tank 100. In the example illustrated in FIG. 14, the water level gauge 80 is installed on the side surface 105 of the water tank 100 (behind the user 2), but an installation position is not particularly limited. However, the water level gauge 80 is preferably installed at a position that does not block view of the stereoscopic view images displayed on the wall surfaces. A method of measuring the water level through the water level gauge 80 and a type of the water level gauge 80 are not particularly limited. For example, the water level gauge 80 may be a contact type water level gauge or may be a non-contact type water level gauge. For example, the water level of the water 3 is a distance from the bottom surface 102 of the water tank 100 to a surface 3B of the water 3.

The water level gauge 80 is connected with the image processing device 24 via various kinds of wired or wireless networks. The water level gauge 80 outputs a measurement result related to the water level of the water 3 to the image processing device 24. The image processing device 24 generates a stereoscopic view image according to the measurement result related to the water level acquired by the water level gauge 80. Specifically, the image processing device 24 generates the stereoscopic view image in a region higher than the water level acquired by the water level gauge 80 and a region lower than the water level in each of the side surfaces of the water tank 100. In the example illustrated in FIG. 14, the image processing device 24 generates different stereoscopic view images which are to be displayed on a lower region 101A of the surface 3B and an upper region 101B of the surface 3B in the side surface 101. Accordingly, the user 2 can experience different stereoscopic images above and below the surface 3B.

Figure 15:
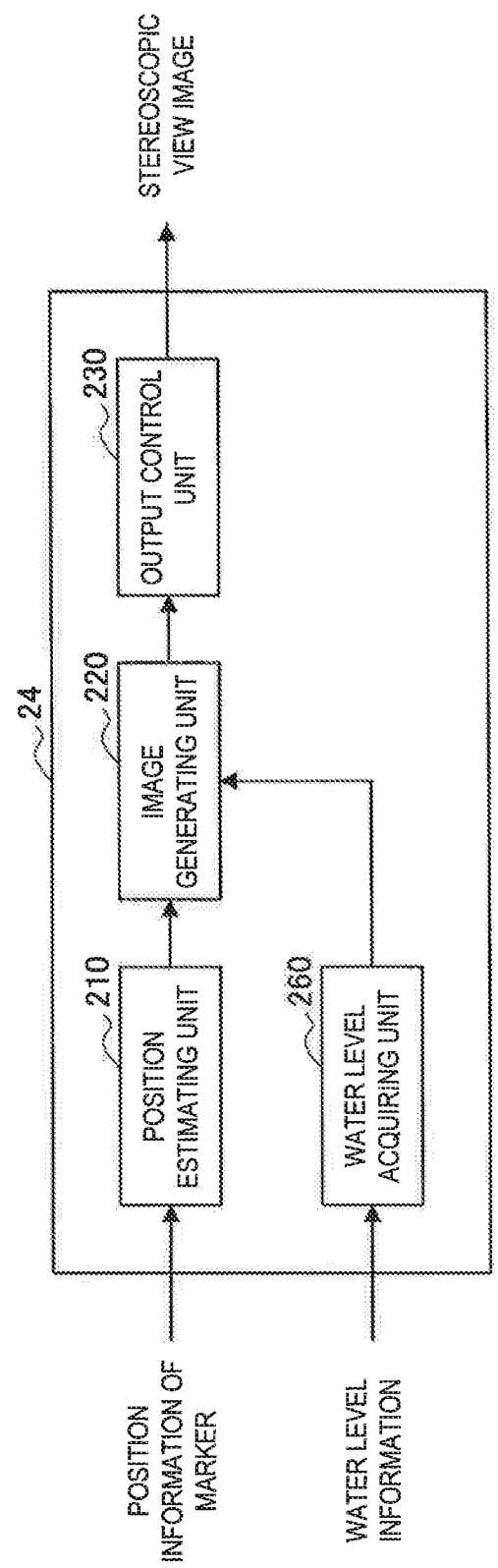
FIG. 15 is a block diagram illustrating an exemplary functional configuration of an image processing device according to the embodiment.

FIG. 15 is a block diagram illustrating an exemplary functional configuration of the image processing device 24 according to the fourth embodiment of the present disclosure. Referring to FIG. 15, the image processing device 24 includes a position estimating unit 210, an image generating unit 220, an output control unit 230, and a water level acquiring unit 260. The position estimating unit 210 and the output control unit 230 according to the present embodiment are the same as the position estimating unit 210 and the output control unit 230 included in the image processing device 21 according to the first embodiment, and thus detailed description is omitted.

(Water Level Acquiring Unit)

The water level acquiring unit 260 has a function of acquiring information related to the water level of the water 3 stored in the water tank 100 measured by the water level gauge 80. For example, the information related to the water level may be a distance from the bottom surface 102 of the water tank 100 to the surface 3B of the water 3. The water level acquiring unit 260 outputs the information related to the water level to the image generating unit 220.

The image generating unit 220 according to the present embodiment generates the stereoscopic view image according to the point-of-view position of the user 2 estimated by the position estimating unit 210 and the water level (the distance from the bottom surface 102 to the surface 3B). For example, the image generating unit 220 may generate different stereoscopic view images which are displayed at the region higher than the water level measured by the water level acquiring unit 260 and the region lower than the water level in the side surface 101, 103, and 104 of the water tank 100.

[4.2. Exemplary Operation]

Figure 16:
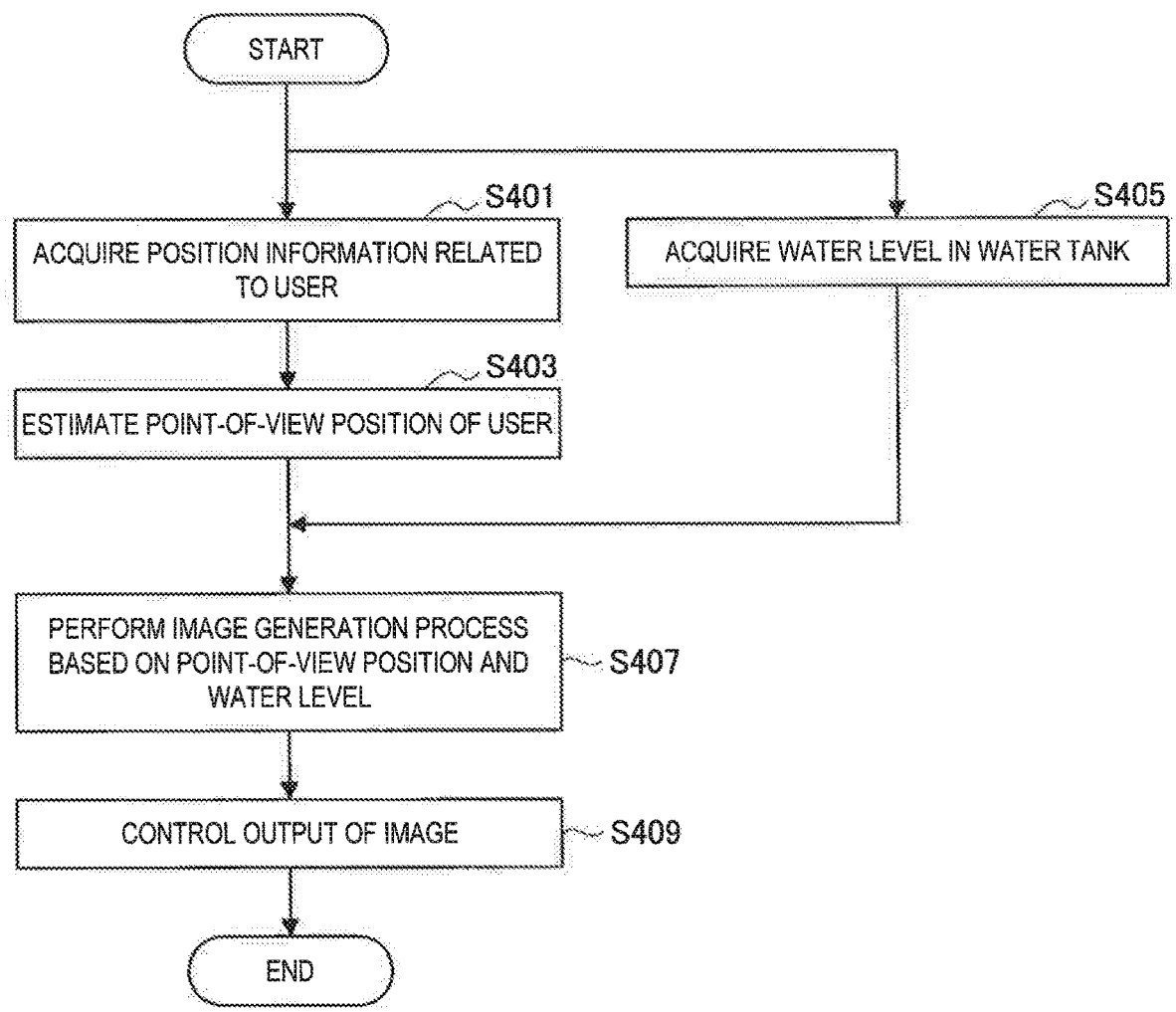
FIG. 16 is a flowchart illustrating an operation of the image processing device according to the embodiment.

FIG. 16 is a flowchart illustrating an operation of the image processing device 24 according to the fourth embodiment of the present disclosure. Referring to FIG. 16, first, the image processing device 24 acquires the position information related to the user (S401). Specifically, the imaging device 40 recognizes the position of the marker attached to the goggles 30 worn by the user 2, and the position estimating unit 210 acquires position information of the recognized marker. The position information of the marker may be acquired using communication with the imaging device 40 through a communication device with which the image processing device 24 is equipped.

Then, the image processing device 24 estimates the position of the eye of the user 2 based on the position information of the marker (S403). Specifically, the position estimating unit 210 estimates the position of the eye of the user 2 as the point-of-view position. Further, the image processing device 24 acquires the information related to the water level of the water 3 stored in the water tank 100 measured by the water level gauge 80 (S405). Specifically, the water level acquiring unit 260 acquires the information related to the water level measured by the water level gauge 80.

Then, the image processing device 24 generates the stereoscopic view image according to the point-of-view position of the user 2 and the water level of the water 3 stored in the water tank 100 (S407). Specifically, the image generating unit 220 generates the stereoscopic view image according to the point-of-view position of the user 2 estimated by the position estimating unit 210, and the water level.

Then, the image processing device 24 performs control such that the stereoscopic view image is output (S409). Specifically, the output control unit 230 performs control such that the stereoscopic view images generated by the image generating unit 220 is output to the projecting device 50.

The image processing device 24 repeatedly performs steps S401 to S409.

[4.3. Effects and Supplements]

As illustrated in FIG. 14, according to the image processing system 14 of the present embodiment, the image processing device 24 generates different stereoscopic view images for the regions above and below the surface 3B based on the water level of the water 3 stored in the water tank 100 measured by the water level gauge 80. Accordingly, the stereoscopic images expressing different environments for the regions above and below the surface 3B are presented to the user 2. Thus, the user 2 can view the different stereoscopic images in the state in which he/she lifts his/her face above the surface 3B and the state in which his/her face is in the water. Accordingly, the user 2 can experience a change in the VR environment associated with movement of the point-of-view position from under the water to above the water.

Figure 17:
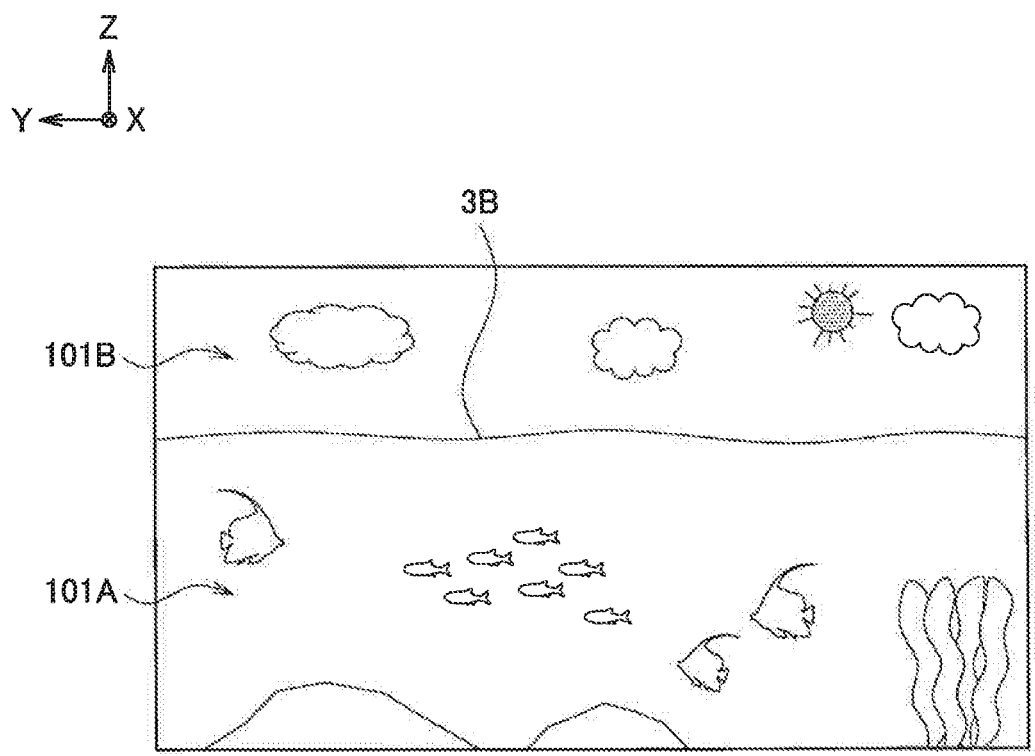
FIG. 17 is a diagram illustrating an example of the image processing system according to the embodiment.

FIG. 17 is a diagram illustrating an example of the image processing system 14 according to the fourth embodiment of the present disclosure. Referring to FIG. 17, different stereoscopic view images are displayed in the lower region 101A of the surface 3B and the upper region 101B of the surface 3B on the side surface 101 of the water tank 100. Specifically, an image related to an environment in the water is displayed in the lower region 101A, and an image related to an environment above the water such as a cloud or the sun is displayed in the upper region 101B.

For example, when the user 2 is swimming in the water storage space, the user 2 views the stereoscopic view image expressed by the stereoscopic image displayed in the lower region 101A. Further, when the user 2 lifts his/her face above the surface 3B, the user 2 views the stereoscopic image expressed by the stereoscopic view image displayed in the upper region 101B. Thus, the user 2 can experience a similar feeling to when he/she is actually swimming near the water surface of the sea.

5. Fifth Embodiment

Next, an image processing system 15 according to a fifth embodiment of the present disclosure will be described. The image processing system 15 according to the present embodiment further includes a sensor for detecting motion of the body of the user 2. Through this configuration, the user 2 can experience an interactive VR space in the water in addition to swimming in the water storage space.

[5.1. Exemplary Configuration]

A configuration of the image processing system 15 is the same as the configuration of the image processing system 11 according to the first embodiment of the present disclosure, and thus description is omitted.

Figure 18:
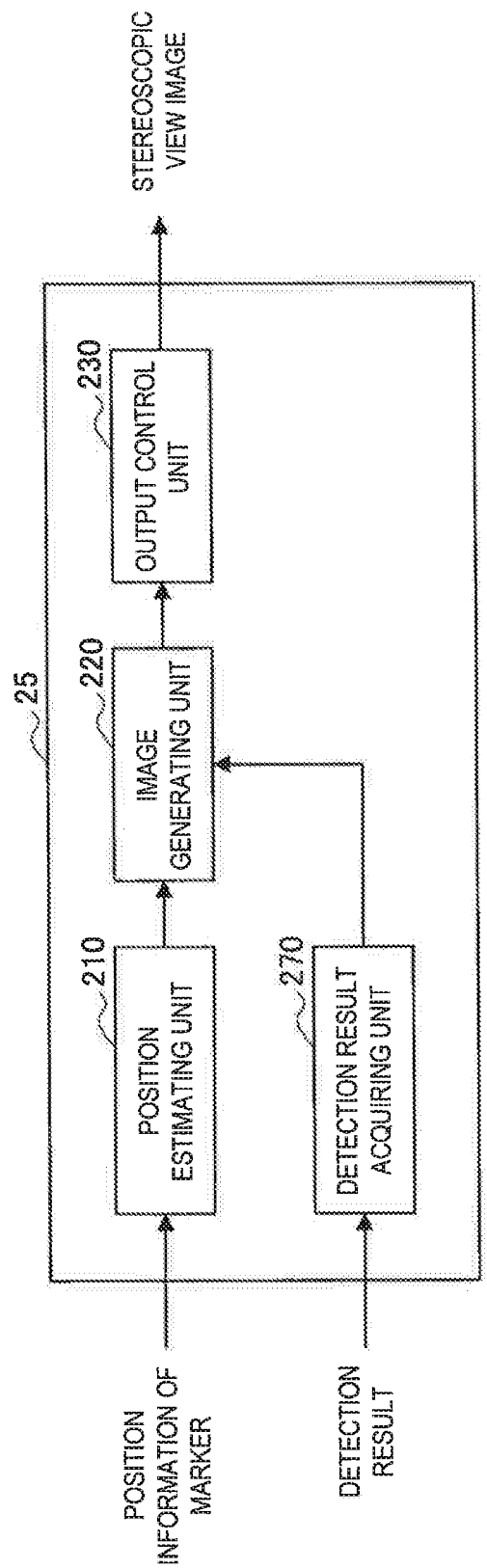
FIG. 18 is a block diagram illustrating an exemplary functional configuration of an image processing device according to a fifth embodiment of the present disclosure.

FIG. 18 is a block diagram illustrating an exemplary functional configuration of an image processing device 25 according to the fifth embodiment of the present disclosure. Referring to FIG. 18, the image processing device 25 includes a position estimating unit 210, an image generating unit 220, an output control unit 230, and a detection result acquiring unit 270. The position estimating unit 210 and the output control unit 230 according to the present embodiment are the same as the position estimating unit 210 and the output control unit 230 included in the image processing device 21 according to the first embodiment, and thus detailed description is omitted.

(Detection Result Acquiring Unit)

The detection result acquiring unit 270 has a function of acquiring a detection result related to an action of the user 2 detected by a sensor (not illustrated). Examples of the detection result include touch of the user 2 on the sensor in the water storage space and motion of a part of the body of the user 2. The detection result is output to the image generating unit 220.

The sensor may be, for example, a touch sensor that detects touch. The touch sensor may be installed in, for example, the wall surfaces of the water tank 100. The touch sensor may detect the touch by the user 2, and the detection result acquiring unit 270 may output the detection result to the image generating unit 220.

The sensor may be a motion sensor that detects motion of a part of the body of the user 2. The motion sensor may be worn on, for example, a part of the body of the user 2. The part of the body may be an arm, a foot, or the like of the user 2. For example, the motion sensor may detect motion of the arm of the user 2. Then, the detection result acquiring unit 270 may acquire a detection result related to the motion of the arm of the user 2 detected by the motion sensor and output the detection result to the image generating unit 220. Further, the motion of the part of the body of the user 2 detected by the motion sensor may be estimated through, for example, a method using a known technique such as machine learning or regression analysis. The estimation of the motion of the part of the body may be performed through the image processing device 25 (for example, the detection result acquiring unit 270) or the motion sensor.

The sensor is not limited to the touch sensor or the motion sensor, and various sensors may be used as long as an action of the user can be detected through the sensors. The sensor may be installed on the goggles 30 worn on the head of the user 2. Accordingly, motion of the head of the user 2 can be detected.

The image generating unit 220 according to the present embodiment generates the stereoscopic view image according to the point-of-view position of the user 2 estimated by the position estimating unit 210 and the detection result by the sensor. For example, when the detection result by the sensor is acquired, the image generating unit 220 may generate a new stereoscopic view image in which an environment or an atmosphere of the VR space expressed by the stereoscopic view image changes.

[5.2. Exemplary Operation]

Figure 19:
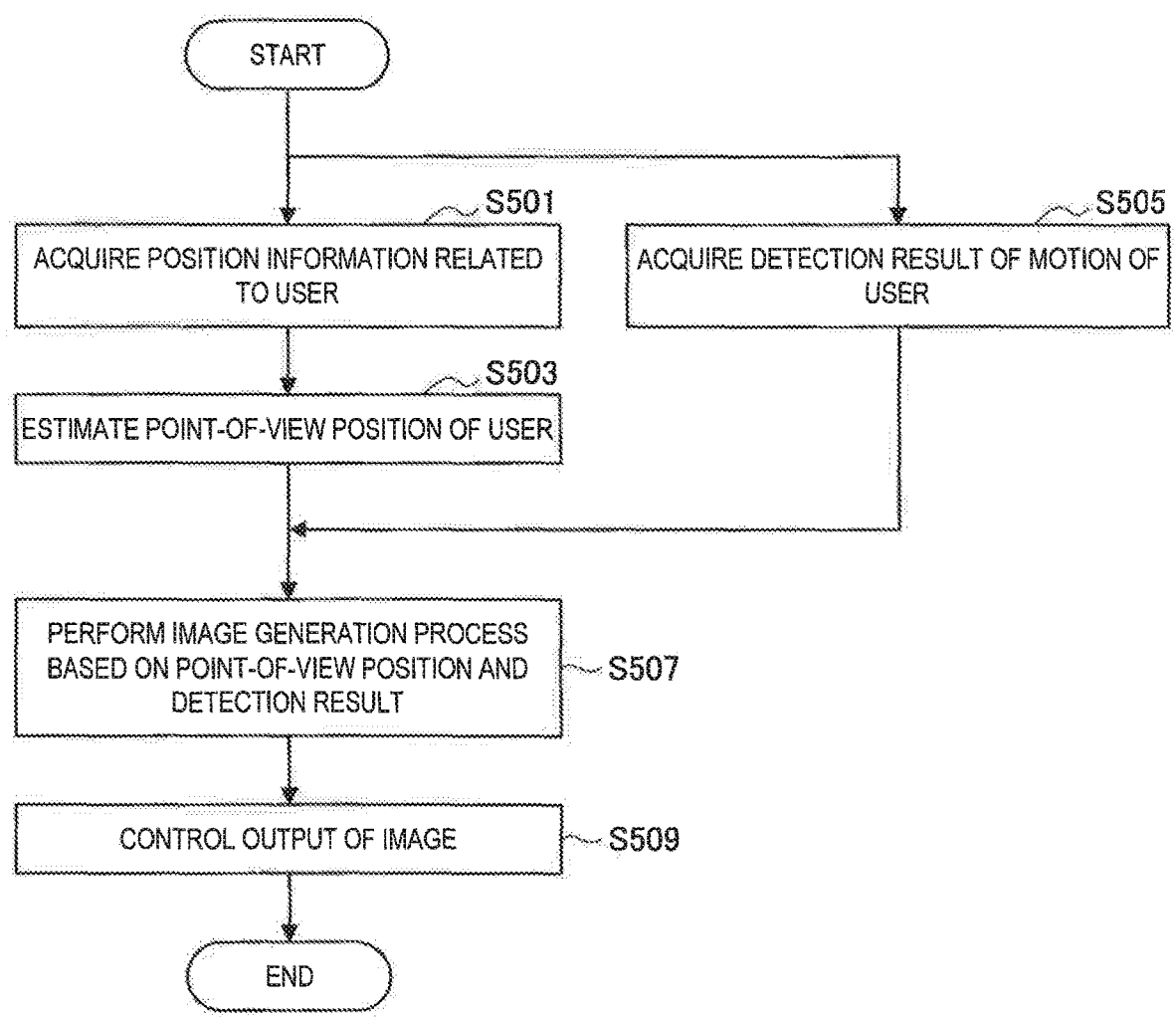
FIG. 19 is a flowchart illustrating an operation of the image processing device according to the embodiment.

FIG. 19 is a flowchart illustrating an operation of the image processing device 25 according to the fifth embodiment of the present disclosure. Referring to FIG. 19, first, the image processing device 25 acquires the position information related to the user (S501). Specifically, the imaging device 40 recognizes the position of the marker attached to the goggles 30 worn by the user 2, and the position estimating unit 210 acquires position information of the recognized marker. The position information of the marker may be acquired using communication with the imaging device 40 through a communication device with which the image processing device 25 is equipped.

Then, the image processing device 25 estimates the position of the eye of the user 2 based on the position information of the marker (S503). Specifically, the position estimating unit 210 estimates the position of the eye of the user 2 as the point-of-view position. Further, the image processing device 25 acquires the detection result detected by the sensor (S505). Specifically, the detection result acquiring unit 270 acquires the detection result related to the motion of the user 2 detected by the sensor.

Then, the image processing device 25 generates the stereoscopic view image according to the point-of-view position of the user 2 and the detection result of the motion of the user 2 (S507). Specifically, the image generating unit 220 generates the stereoscopic view image according to the point-of-view position of the user 2 estimated by the position estimating unit 210 and the detection result of the motion of the user 2.

Then, the image processing device 25 performs control such that the stereoscopic view image is output (S509). Specifically, the output control unit 230 performs control such that the stereoscopic view images generated by the image generating unit 220 are output to the projecting device 50.

The image processing device 25 repeatedly perform steps S501 to S509.

[5.3. Effects and Supplements]

According to the image processing system 15 of the present embodiment, the image processing device 25 generates the stereoscopic view image according to the motion of the user 2 detected through the sensor. Accordingly, the stereoscopic image corresponding to the motion of the user 2 is presented to the user 2. Thus, the user 2 can experience an interactive VR environment in the water in addition to swimming in the water storage space.

Figure 20:
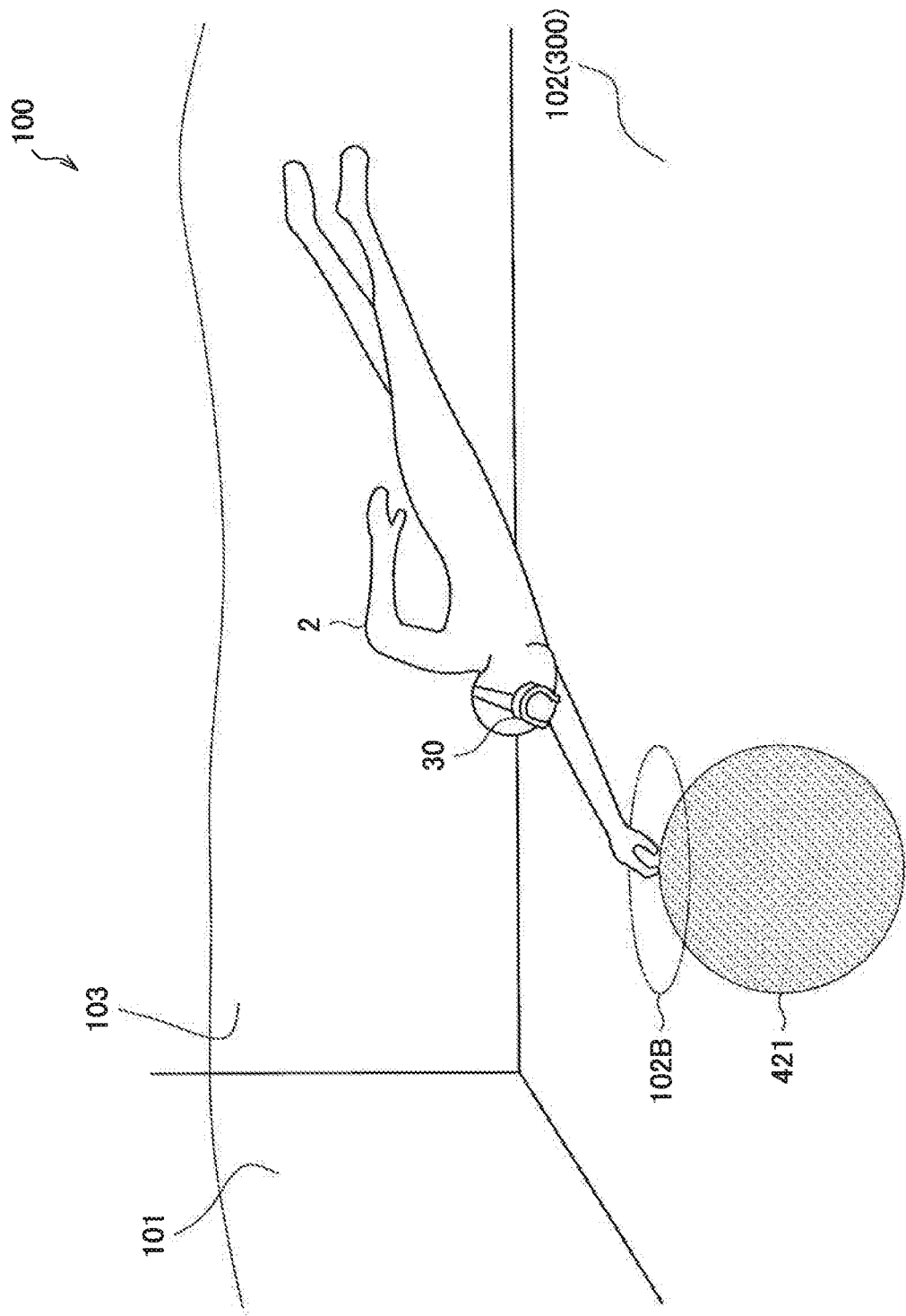
FIG. 20 is a diagram illustrating a first example of the image processing system according to the embodiment.

FIG. 20 is a diagram illustrating a first example of the image processing system 15 according to the fifth embodiment of the present disclosure. In the example illustrated in FIG. 20, a touch sensor 300 is installed in all or a part of the bottom surface 102 of the water tank 100. Here, a stereoscopic view image for expressing a spherical stereoscopic image 421 is displayed on the region 102B of the bottom surface 102. In other words, the user 2 can view the spherical stereoscopic image 421 through the goggles 30.

At this time, for example, the user 2 is assumed to dive towards the bottom surface 102 in order to touch the spherical stereoscopic image 421 and then touch the region 102B of the bottom surface 102. In this case, the touch sensor 300 detects the touch by the user 2, and a detection result is output to the image processing device 25. Then, the image processing device 25 performs control such that the stereoscopic view image according to the detection result related to the touch by the user 2 is generated and output. For example, the image processing device 25 may 16 generate a stereoscopic view image for expressing a stereoscopic image in which the spherical stereoscopic image 421 bursts. Accordingly, the user 2 can experience a feeling that the spherical stereoscopic image 421 actually bursts by touching the spherical stereoscopic image 421.

Figure 21:
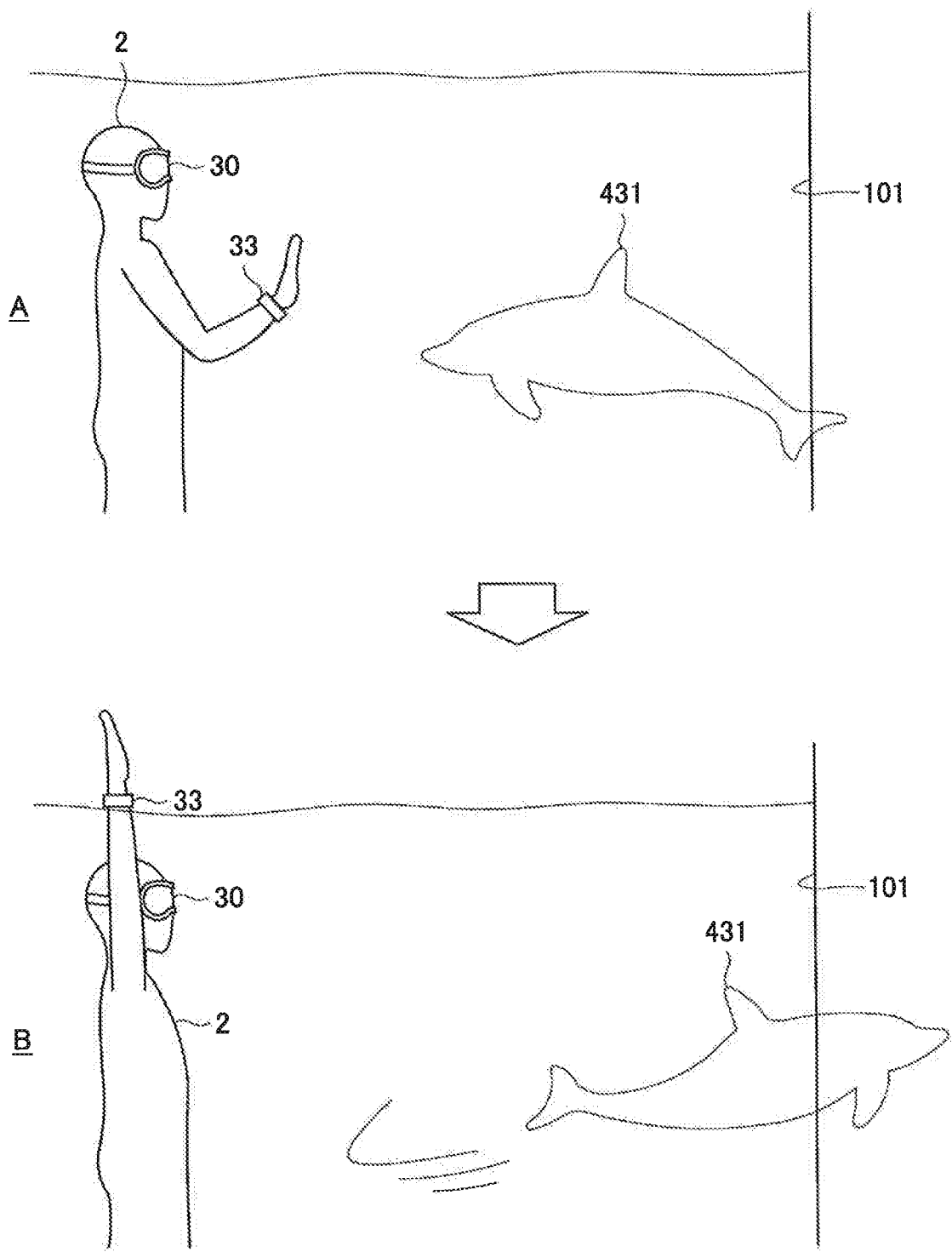
FIG. 21 is a diagram illustrating a second example of the image processing system according to the embodiment.

FIG. 21 is a diagram illustrating a second example of the image processing system 15 according to the fifth embodiment of the present disclosure. In examples illustrated in A and B of FIG. 21, the user 2 in the water storage space wears a motion sensor 33 on his/her wrist. The motion sensor 33 detects motion of the arm of the user 2. Further, a stereoscopic view image for expressing a stereoscopic image 431 of a dolphin is displayed on the wall surfaces of the water tank 100. In other words, the user 2 can view the stereoscopic image 431 of the dolphin through the goggles 30.

Here, in the example of A of FIG. 21, the user 2 faces the stereoscopic image 431 of the dolphin, and moves the palm of the hand on which he/she wears the motion sensor 33 to face the front side of the stereoscopic image 431 of the dolphin. Thereafter, when the user 2 performs a specific motion such as a motion of moving the hand on which he/she wears the motion sensor 33 in a specific direction (for example, an upward direction) or the like, the motion sensor 33 detects the specific motion, and outputs a detection result to the image processing device 25. The image processing device 25 performs control such that a stereoscopic view image for expressing movement of the stereoscopic image 431 of the dolphin is generated according to the detection result and output. For example, in the example of B of FIG. 21, the motion sensor 33 detects that the user 2 raises his/her hand in the upward direction, and the image processing device 25 sequentially generates stereoscopic view images for expressing that the stereoscopic image 431 of the dolphin swims in a direction away from the user 2 according to the detection result. Accordingly, when the user 2 raises his/her hand in the upward direction, the user 2 can view that the stereoscopic image 431 of the dolphin moves in a direction away from the user 2. Thus, the user 2 can experience a feeling that the dolphin moves according to his/her gesture.

6. Sixth Embodiment

Next, an image processing system 16 according to the sixth embodiment of the present disclosure will be described. The image processing system 16 according to the present embodiment further includes a component that outputs a sound to the user 2. Through this configuration, the user 2 can experience a VR space providing a highly realistic feeling.

[6.1. Exemplary Configuration]

A configuration of the image processing system 16 is the same as the configuration of the image processing system 11 according to the first embodiment of the present disclosure, and thus description is omitted.

Figure 22:
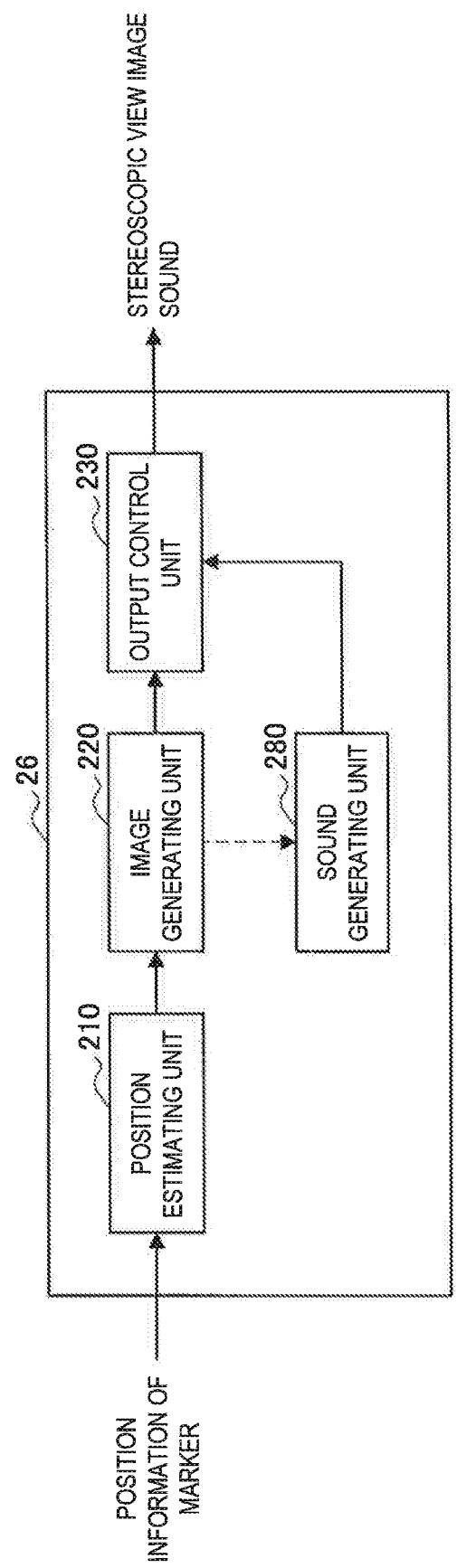
FIG. 22 is a block diagram illustrating an exemplary functional configuration of an image processing device according to a sixth embodiment of the present disclosure.

FIG. 22 is a block diagram illustrating an exemplary functional configuration of an image processing device 26 according to the sixth embodiment of the present disclosure. Referring to FIG. 22, the image processing device 26 includes a position estimating unit 210, an image generating unit 220, an output control unit 230, and a sound generating unit 280. The position estimating unit 210 and the image generating unit 220 according to the present embodiment are the same as the position estimating unit 210 and the image generating unit 220 included in the image processing device 21 according to the first embodiment, and thus detailed description is omitted.

(Sound Generating Unit)

The sound generating unit 280 has a function of generating a sound to be output to the user 2. For example, the sound generating unit 280 generates a sound according to an environment of the VR space which is being experienced by the user 2. Accordingly, it is possible to further increase the realistic feeling of the VR space. The generated sound is output to the output control unit 230.

The output control unit 230 according to the present embodiment performs control such that the sound generated by the sound generating unit 280 is output in addition to the stereoscopic view images generated by the image generating unit 220. For example, the sound may be output to an acoustic output device such as a headphone, an earphone, or the like worn by the user 2. The sound generated in the sound generating unit 280 may be, for example, a stereophonic sound. For example, the stereophonic sound may be generated through a binaural method. Accordingly, it is possible to further increase the realistic feeling of the VR space.

[6.2. Exemplary Operation]

Figure 23:
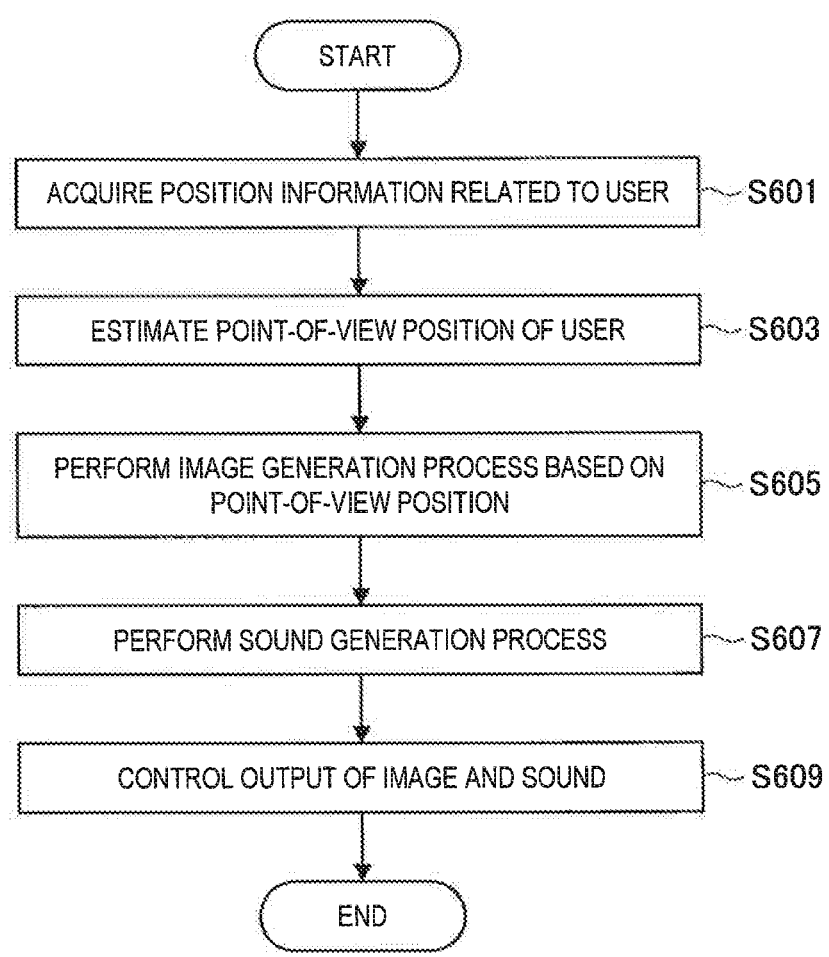
FIG. 23 is a flowchart illustrating an operation of the image processing device according to the embodiment.

FIG. 23 is a flowchart illustrating an operation of the image processing device 26 according to the sixth embodiment of the present disclosure. Referring to FIG. 23, first, the image processing device 26 acquires the position information related to the user (S601). Specifically, the imaging device 40 recognizes the position of the marker attached to the goggles 30 worn by the user 2, and the position estimating unit 210 acquires position information of the recognized marker. The position information of the marker may be acquired using communication with the imaging device 40 through a communication device with which the image processing device 23 is equipped.

Then, the image processing device 26 estimates the position of the eye of the user 2 based on the position information of the marker (S603). Specifically, the position estimating unit 210 estimates the position of the eye of the user 2 as the point-of-view position.

Then, the image processing device 26 generates the stereoscopic view image according to the point-of-view position of the user 2 (S605). Specifically, the image generating unit 220 generates the stereoscopic view image according to the point-of-view position of the user 2 estimated in the position estimating unit 210. Further, the image processing device 26 generates a sound to be output to the user 2 (S607). Specifically, the sound generating unit 280 generates the sound to be output to the user 2.

Then, the image processing device 26 performs control such that the stereoscopic view image and the sound are output (S609). Specifically, the output control unit 230 performs control such that the stereoscopic view images generated by the image generating unit 220 are output to the projecting device 50, and performs control such that the sound generated by the sound generating unit 280 is output to the acoustic output device worn by the user.

The image processing device 26 repeatedly performs steps S601 to S609.

[6.3. Effects and Supplements]

According to the image processing system 16 of the present embodiment, the sound generating unit 280 that generates the sound to be output to the user 2 is included in the image processing device 26. Accordingly, the user 2 can experience the VR environment having the highly realistic feeling in the water storage space. Further, the sound corresponding to the stereoscopic view image for expressing the VR space including the stereoscopic image is generated, and thus the VR space can be more effectively experienced. For example, when the stereoscopic images for expressing the record lines described above in the example of the second embodiment of the present disclosure are expressed, the image processing device 26 may generate a sound (a stereophonic sound) according to the distance between the record line and the user 2. Accordingly, the user 2 can not only recognize the stereoscopic image indicating the recording line through a sense of vision but also recognize the distance from the record line through a sense of hearing. Thus, the user 2 can more intuitively obtain information related to training.

7. Seventh Embodiment

Next, an image processing system 17 according to the seventh embodiment of the present disclosure will be described. The image processing system 17 according to the present embodiment further includes a component for displaying a stereoscopic view image according to the point-of-view position of each user and a component of controlling shielding of the fields of view of a plurality of users when there are a plurality of users in the same water storage space. Through this configuration, even when a plurality of users view the stereoscopic image in the water storage space, the users can experience the VR space at the same time.

[7.1. Exemplary Configuration]

A configuration of the image processing system 17 is the same as the configuration of the image processing system 11 according to the first embodiment of the present disclosure, and thus a description is omitted. In the present embodiment, an image processing device 27 performs wireless communication with the goggles 30 worn by a plurality of users.

Figure 24:
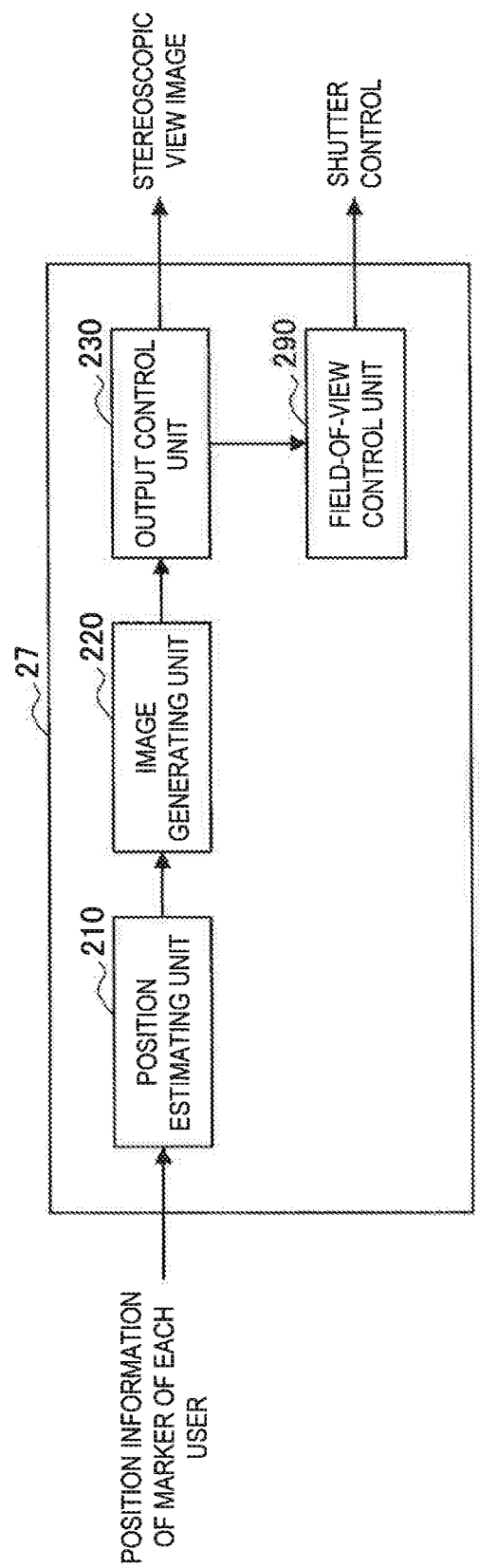
FIG. 24 is a block diagram illustrating an exemplary functional configuration of an image processing device according to a seventh embodiment of the present disclosure.

FIG. 24 is a block diagram illustrating an exemplary functional configuration of the image processing device 27 according to the seventh embodiment of the present disclosure. Referring to FIG. 24, the image processing device 27 includes a position estimating unit 210, an image generating unit 220, an output control unit 230, and a field-of-view control unit 290. The position estimating unit 210, the image generating unit 220, and the output control unit 230 according to the present embodiment are the same as the position estimating unit 210, the image generating unit 220, and the output control unit 230 included in the image processing device 21 according to the first embodiment, and thus a detailed description is omitted.

(Field-of-View Control Unit)

The field-of-view control unit 290 controls switching of whether or not the fields of view of a plurality of users are shielded according to a timing at which the stereoscopic view image generated according to the point-of-view position of one user among a plurality of users is displayed. For example, when the output control unit 230 performs control such that the stereoscopic view image generated according to the point-of-view position of one user is output to the wall surfaces of the water tank 100, the field-of-view control unit 290 performs control such that the field of view of one user is opened, and the fields of view of the other users are shielded according to a timing at which the stereoscopic view image is displayed on the wall surfaces.

For example, there are assumed to be two users (referred to as "users A and B") in the same water storage space. The image generating unit 220 first generates a left eye stereoscopic view image of the user A. The output control unit 230 performs control such that the left eye stereoscopic view image of the user A is displayed on the wall surfaces of the water tank 100 at a first time. At this time, the field-of-view control unit 290 acquires information indicating that the left eye stereoscopic view image of the user A is displayed at the first time from the output control unit 230. Then, the field-of-view control unit 290 controls the liquid crystal shutter of the goggles 30 such that the field of view of the left eye of the user A is opened at the first time. At this time, the field-of-view control unit 290 controls the liquid crystal shutter such that the field of view of the right eye of the user A and all fields of view of the user B are shielded at the first time.

Then, the image generating unit 220 generates the left eye stereoscopic view image of the user B. The output control unit 230 performs control such that the left eye stereoscopic view image of the user B is displayed at a second time subsequent to the first time. At this time, the field-of-view control unit 290 acquires information indicating that the left eye stereoscopic view image of the user B is displayed at the second time. Then, the field-of-view control unit 290 controls the liquid crystal shutter such that the field of view of the left eye of the user B is opened at the second time. At this time, the field-of-view control unit 290 controls the liquid crystal shutter such that the field of view of the right eye of the user B and all fields of view of the user A are shielded at the second time.

Thereafter, the image generating unit 220 generates the left or right eye stereoscopic view image of the user A or B alternately and repeatedly. The output control unit 230 performs control such that the generated stereoscopic view image is displayed on the wall surfaces of the water tank 100, and the field-of-view control unit 290 controls switching of whether or not the fields of view of the users are shielded according to a timing at which the stereoscopic view image is displayed on the wall surfaces.

[7.2. Exemplary Operation]

Figure 25:
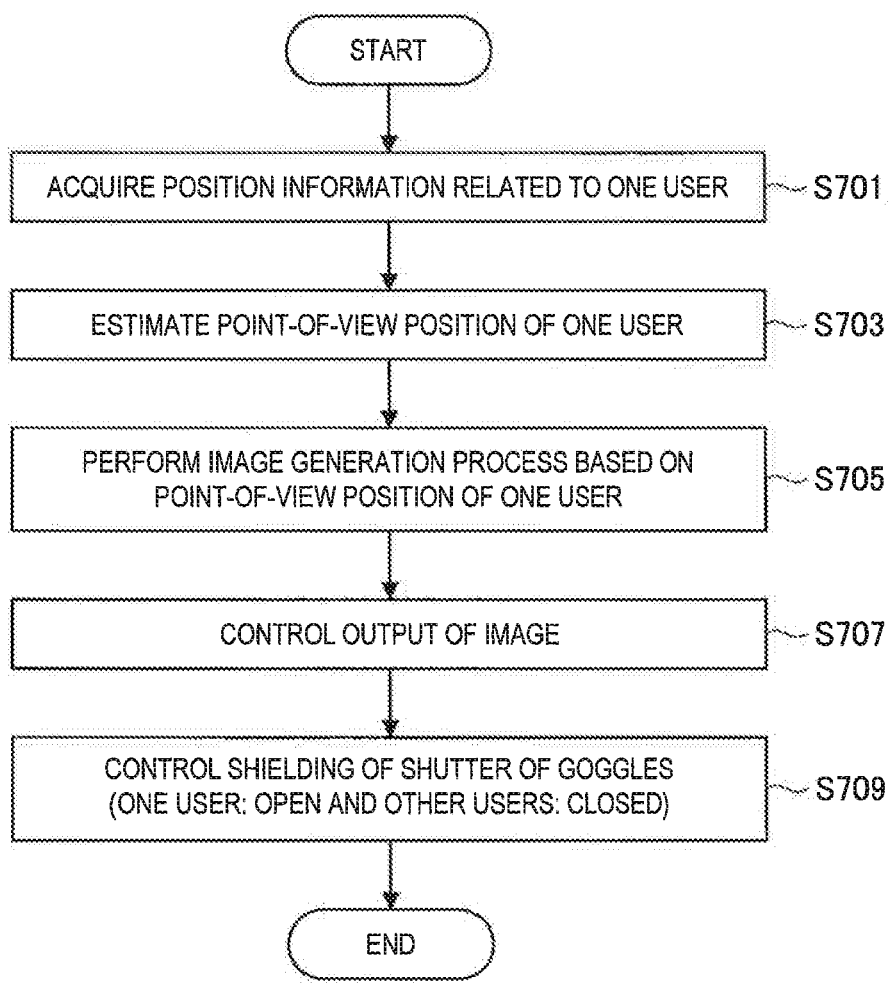
FIG. 25 is a flowchart illustrating an operation of the image processing device according to the embodiment.

FIG. 25 is a flowchart illustrating an operation of the image processing device 27 according to the seventh embodiment of the present disclosure. Referring to FIG. 25, first, the image processing device 27 acquires the position information related to one user (S701). Specifically, the imaging device 40 recognizes the position of the marker attached to the goggles 30 worn by the one user, and the position estimating unit 210 acquires the position information of the recognized marker. The position information of the marker may be acquired using communication with the imaging device 40 through a communication device with which the image processing device 27 is equipped.

Then, the image processing device 27 estimates the position of the eye of the one user based on the position information of the marker (S703). Specifically, the position estimating unit 210 estimates the position of the eye of the one user as the point-of-view position.

Then, the image processing device 27 generates the stereoscopic view image according to the point-of-view position of the one user (S705). Specifically, the image generating unit 220 generates the stereoscopic view image according to the point-of-view position of the one user estimated in the position estimating unit 210.

Then, the image processing device 27 performs control such that the stereoscopic view image is output (S707). Specifically, the output control unit 230 performs control such that the stereoscopic view images generated by the image generating unit 220 are output to the projecting device 50.

Then, the image processing device 27 controls whether or not the liquid crystal shutters of the goggles 30 worn by a plurality of users are shielded (S709). Specifically, the field-of-view control unit 290 controls the liquid crystal shutter such that the field of view of the one user is opened. Further, the field-of-view control unit 290 controls the liquid crystal shutter such that the fields of view of other users are shielded.

The image processing device 27 repeatedly performs steps S701 to S709. For example, after steps S701 to S709 are performed, steps S701 to S709 may be performed for the other users different from the one user.

[7.3. Effects and Supplements]

According to the image processing system 17 of the present embodiment, the field-of-view control unit 290 that controls whether or not the fields of view of a plurality of users are shielded according to the stereoscopic view image to be displayed on the wall surfaces of the water tank 100 is included in the image processing device 27. Accordingly, when there are a plurality of users in the water storage space, the stereoscopic view images according to the point-of-view positions of the users are alternately displayed on the wall surfaces of the water tank 100. Thus, a plurality of users can experience the VR space in the water storage space at the same time.

In the present embodiment, the field-of-view control unit 290 included in the image processing device 27 controls whether or not the liquid crystal shutters of the goggles 30 worn by a plurality of users are shielded, but the present technology is not limited to this example. For example, the DLP link method may be used as described above as the first embodiment of the present disclosure. In this case, for example, synchronous frames for synchronizing the shielding timing of the field of view with the display timing of the stereoscopic view image are inserted into a display frame by the number of users. The output control unit 230 performs control such that the synchronous frames are output, and the photo sensor of the liquid crystal shutter of the goggles 30 recognizes the synchronous frame corresponding to the user wearing the goggles among the synchronous frames as the synchronous signal of the stereoscopic view image corresponding to the user. Accordingly, the liquid crystal shutter can appropriately control switching of whether or not shielding is performed. Thus, even when a plurality of users view the stereoscopic image in the water storage space, the users can experience the VR space at the same time. Further, when the configuration using the DLP link method is applied to the image processing system 17 according to the present embodiment, the image processing device 27 according to the present embodiment need not necessarily include the field-of-view control unit 290.

<8. Hardware Configuration>

Figure 26:
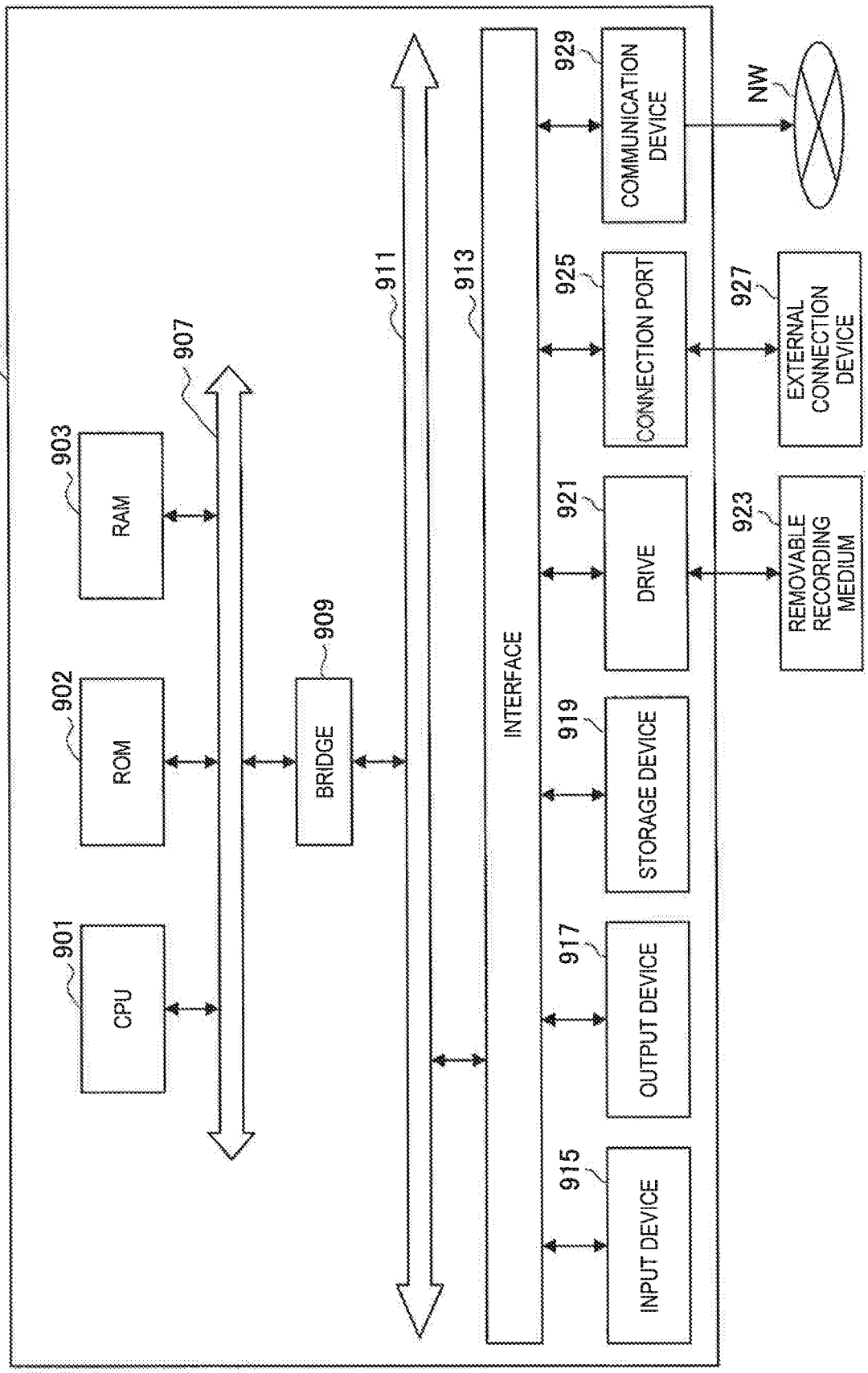
FIG. 26 is a block diagram illustrating an exemplary hardware configuration of an information processing device according to an embodiment of the present disclosure.

Next, with reference to FIG. 26, a hardware configuration that is capable of realizing an information processing device according to an embodiment of the present disclosure will be described. FIG. 26 is a block diagram showing an example of a hardware configuration of an information processing device. An information processing device 900 which is shown may achieve the image processing devices 21 to 27 in the above described embodiments, for example.

The information processing device 900 includes a central processing unit (CPU) 901, read only memory (ROM) 903, and random access memory (RAM) 905. Further, the information processing device 900 may also include a host bus 907, a bridge 909, an external bus 911, an interface 913, an input device 915, an output device 917, a storage device 919, a drive 921, a connection port 923, and a communication device 925. The information processing device 900 may also include, instead of or along with the CPU 901, a processing circuit such as a digital signal processor (DSP) or an application specific integrated circuit (ASIC).

The CPU 901 functions as an arithmetic processing unit and a control unit and controls an entire operation or a part of the operation of the information processing device 900 according to various programs recorded in the ROM 903, the RAM 905, the storage device 919, or a removable recording medium 923. For example, the CPU 901 controls general operations of the functional units included in the image processing devices 21 to 27 in the above embodiments. The ROM 903 stores programs and arithmetic parameters used by the CPU 901. The RAM 905 primarily stores programs used in execution of the CPU 901 and parameters and the like varying as appropriate during the execution. The CPU 901, the ROM 903, and the RAM 905 are connected to each other via the host bus 907 configured from an internal bus such as a CPU bus or the like. In addition, the host bus 907 is connected to the external bus 911 such as a peripheral component interconnect/interface (PCI) bus via the bridge 909.

The input device 915 is a device operated by a user, such as a mouse, a keyboard, a touch panel, buttons, a switch, and a lever. Also, the input device 915 may be a remote control device using, for example, infrared light or other radio waves, or may be an external connection device 927 such as a cell phone compatible with the operation of the information processing device 900. The input device 915 includes an input control circuit that generates an input signal on the basis of information input by the user and outputs the input signal to the CPU 901. The user inputs various kinds of data to the information processing device 900 and instructs the information processing device 900 to perform a processing operation by operating the input device 915.

The output device 917 is configured from a device capable of visually or aurally notifying the user of acquired information. For example, the output device 917 may be: a display device such as a liquid crystal display (LCD), a plasma display panel (PDP), or an organic electro-luminescence (OLED) display; a sound output device such as a speaker or headphones; or a printer. The output device 917 outputs results obtained by the processing performed by the information processing device 900 as video in the form of text or an image or as audio in the form of sound.

The storage device 919 is a device for storing data configured as an example of a storage unit of the information processing device 900. The storage device 919 is configured from, for example, a magnetic storage device such as a hard disk drive (HDD), a semiconductor storage device, an optical storage device, or a magneto-optical storage device. This storage device 919 stores programs to be executed by the CPU 901, various data, and various data obtained from the outside.

The drive 921 is a reader/writer for the removable recording medium 923 such as a magnetic disk, an optical disc, a magneto-optical disk, or a semiconductor memory, and is built in or externally attached to the information processing device 900. The drive 921 reads out information recorded on the attached removable recording medium 923, and outputs the information to the RAM 905. Further, the drive 921 writes the record on the attached removable recording medium 923.

The connection port 925 is a port for allowing devices to directly connect to the information processing device 900. Examples of the connection port 925 include a universal serial bus (USB) port, an IEEE 1394 port, and a small computer system interface (SCSI) port. Other examples of the connection port 925 may include an RS-232C port, an optical audio terminal, and a high-definition multimedia interface (HDMI) (registered trademark) port. The connection of the external connection device 927 to the connection port 925 may enable the various data exchange between the information processing device 900 and the external connection device 927.

The communication device 929 is a communication interface configured from, for example, a communication device for establishing a connection to a communication network NW. The communication device 929 is, for example, a wired or wireless local area network (LAN), Bluetooth (registered trademark), a communication card for wireless USB (WUSB), or the like. Alternatively, the communication device 929 may be a router for optical communication, a router for asymmetric digital subscriber line (ADSL), a modem for various communications, or the like. The communication device 929 can transmit and receive signals and the like using a certain protocol such as TCP/IP on the Internet and with other communication devices, for example. The communication network NW connected to the communication device 929 is configured from a network which is connected via wire or wirelessly and is, for example, the Internet, a home-use LAN, infrared communication, radio wave communication, and satellite communication.

Heretofore, an example of the hardware configuration of the information processing device 900 has been shown. Each of the structural elements described above may be configured using a general-purpose material, or may be configured from hardware dedicated to the function of each structural element. The configuration may be changed as appropriate according to the technical level at the time of carrying out embodiments.

9. Conclusion

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the image processing systems in the above embodiments, the water tank and the image processing device are separately configured, but the present technology is not limited to this example. For example, the image processing device may be configured as an image processing device which is formed integrally with the water tank.

For example, the operation of the image processing device is not necessarily performed in time series in order described in the flowchart. For example, the operation of the image processing device may be performed in a different order from that described in the flowchart, or at least a part of the operation described in the flowchart may be performed in parallel.

Also, hardware embedded in the computer, such as a CPU, a ROM, and a RAM, can be implemented by a program for exhibiting the same functions as the configuration of the above-described image processing device. Also, it is possible to provide a non-transitory computer-readable recording medium storing the relevant program.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)

An image processing device, including:

a wall configured to form a water storage space; and an image generating unit configured to generate a stereoscopic view image to be displayed on the wall toward an inside of the water storage space.

(2)

The image processing device according to (1), wherein the image generating unit generates the stereoscopic view image for expressing a depth from the wall according to a point-of-view position in the water storage space.

(3)

The image processing device according to (2), further including a position estimating unit configured to estimate the point-of-view position in the water storage space, wherein the image generating unit generates a stereoscopic view image according to the point-of-view position estimated through the position estimating unit.

(4)

The image processing device according to (3), wherein the position estimating unit estimates a position of an eye of a user who is in the water storage space as the point-of-view position.

(5)

The image processing device according to (4), wherein the position estimating unit estimates the position of the eye of the user based on a position of a marker member worn by the user.

(6)

The image processing device according to (5), wherein the marker member is worn on a head of the user.

(7)

The image processing device according to (5) or (6), wherein a position of the marker member is specified through one or more imaging devices.

(8)

The image processing device according to any one of (4) to (7), further including a water flow control unit configured to control a flow velocity related to a flow of water stored in the water storage space, wherein the image generating unit estimates a virtual travel distance of the user in a flow direction of the water according to a change in the point-of-view position in the flow direction of the water and the flow velocity, and generates a stereoscopic view image according to the virtual travel distance.

(9)

The image processing device according to any one of (4) to (8), wherein the image generating unit generates the stereoscopic view image according to a magnitude of force applied from the user to a fixing member configured to fix a position of the user and a direction of the force.

(10)

The image processing device according to any one of (4) to (9), wherein the image generating unit generates the stereoscopic view image according to an action of the user detected through a sensor.

(11)

The image processing device according to (10), wherein the sensor is a sensor that is installed in the water storage space and configured to detect touch, and the action of the user is touch on the sensor.

(12)

The image processing device according to (10) or (11), wherein the sensor detects motion of a part of a body of the user, and the image generating unit generates a stereoscopic view image according to the motion of the part of the body.

(13)

The image processing device according to any one of (4) to (12), further including a sound generating unit configured to generate a sound to be output to the user.

(14)

The image processing device according to any one of (4) to (13), further including:

an output control unit configured to perform control such that stereoscopic view images generated according to point-of-view positions of users through the image generating unit are displayed on the wall at different timings; and a field-of-view control unit configured to control switching of whether or not fields of view of the users are shielded according to the timings.

(15)

The image processing device according to any one of (2) to (14), wherein, when the point-of-view position is higher than a water level of water stored in the water storage space, the image generating unit generates a stereoscopic view image which is different from the stereoscopic view image displayed toward the inside of the water storage space and displayed on a region of the wall higher than the water level.

(16)

The image processing device according to any one of (1) to (15), wherein the stereoscopic view image is displayed on at least any one of a side surface and a bottom surface of the wall.

(17)

The image processing device according to any one of (1) to (16), wherein a projection film is attached to the wall, and the stereoscopic view image is displayed on the projection film through one or more projecting devices.

(18)

An image processing system, including:

a wall configured to form a water storage space; and an image generating unit configured to generate a stereoscopic view image to be displayed on the wall toward an inside of the water storage space.

REFERENCE SIGNS LIST 11 to 17 image processing system
21 to 27 image processing device
30 goggles
31 snorkel
32 marker
33 motion sensor
40 imaging device
51 to 54 projecting device
60 water flow generating device
70 acting force measuring device
71 rope
72 acting force measuring plate
80 water level gauge
100 water tank
210 position estimating unit
220 image generating unit
230 output control unit
240 water flow control unit
250 acting force acquiring unit
260 water level acquiring unit
270 detection result acquiring unit
280 sound generating unit
290 field-of-view control unit
300 touch sensor

The invention claimed is:

1. An image processing device, comprising:

a wall configured to form a water storage space that stores water; and an image generating unit configured to generate a stereoscopic view image to be displayed on the wall toward an inside of the water storage space, wherein the image generating unit generates the stereoscopic view image according to a measured water level of the water stored in the water storage space, wherein the image generating unit generates the stereoscopic view image with a first stereoscopic image provided in a lower region of the wall lower than the measured water level and a second stereoscopic image provided in an upper region of the wall higher than the measured water level, wherein the first stereoscopic image of the stereoscopic view image is different from the second stereoscopic image of the stereoscopic view image, and wherein the image generating unit is implemented via at least one processor.

2. The image processing device according to claim 1, wherein the image generating unit generates the stereoscopic view image for expressing a depth from the wall according to a point-of-view position in the water storage space.

3. The image processing device according to claim 2, further comprising a position estimating unit configured to estimate the point-of-view position in the water storage space, wherein the image generating unit generates the stereoscopic view image according to the point-of-view position estimated through the position estimating unit, and wherein the position estimating unit is implemented via at least one processor.

4. The image processing device according to claim 3, wherein the position estimating unit estimates a position of an eye of a user who is in the water storage space as the point-of-view position.

5. The image processing device according to claim 4, wherein the position estimating unit estimates the position of the eye of the user based on a position of a marker member worn by the user.

6. The image processing device according to claim 5, wherein the marker member is worn on a head of the user.

7. The image processing device according to claim 5, wherein a position of the marker member is specified through one or more imaging devices.

8. The image processing device according to claim 4, further comprising
a water flow control unit configured to control a flow velocity related to a flow of water stored in the water storage space,
wherein the image generating unit estimates a virtual travel distance of the user in a flow direction of the water according to a change in the point-of-view position in the flow direction of the water and the flow velocity, and generates the stereoscopic view image according to the virtual travel distance, and
wherein the water flow control unit is implemented via at least one processor.

9. The image processing device according to claim 4, wherein the image generating unit generates the stereoscopic view image according to a magnitude of force applied from the user to a fixing member configured to fix a position of the user and a direction of the force.

10. The image processing device according to claim 4, wherein the image generating unit generates the stereoscopic view image according to an action of the user detected through a sensor.

11. The image processing device according to claim 10, wherein the sensor is installed in the water storage space and configured to detect touch, and
wherein the action of the user comprises a touch on the sensor.

12. The image processing device according to claim 10, wherein the sensor detects motion of a part of a body of the user, and
wherein the image generating unit generates the stereoscopic view image according to the motion of the part of the body.

13. The image processing device according to claim 4, further comprising
a sound generating unit configured to generate a sound to be output to the user,
wherein the sound generating unit is implemented via at least one processor.

14. The image processing device according to claim 4, further comprising:
an output control unit configured to perform control such that stereoscopic view images generated according to point-of-view positions of users through the image generating unit are displayed on the wall at different timings; and
a field-of-view control unit configured to control switching of whether or not fields of view of the users are shielded according to the timings,
wherein the output control unit and the field-of-view control unit are each implemented via at least one processor.

15. The image processing device according to claim 2, wherein, when the point-of-view position is higher than the measured water level of the water stored in the water storage space, the image generating unit generates a different stereoscopic view image which is different from the stereoscopic view image displayed toward the inside of the water storage space when the point-of-view position is lower than the measured water level.

16. The image processing device according to claim 1, wherein the stereoscopic view image is displayed on at least any one of a side surface and a bottom surface of the wall.

17. The image processing device according to claim 1, wherein a projection film is attached to the wall, and
wherein the stereoscopic view image is displayed on the projection film through one or more projecting devices.

18. The image processing device according to claim 1, wherein the image generating unit acquires the measured water level from a water level gauge in order to generate the stereoscopic view image.

19. The image processing device according to claim 1, further comprising:
a water level gauge configured to measure the water level,
wherein the image generating unit acquires the measured water level from the water level gauge in order to generate the stereoscopic view image.

20. An image processing system, comprising:
a wall configured to form a water storage space that stores water; and
an image generating unit configured to generate a stereoscopic view image to be displayed on the wall toward an inside of the water storage space,
wherein the image generating unit generates the stereoscopic view image according to a measured water level of the water stored in the water storage space,
wherein the image generating unit generates the stereoscopic view image with a first stereoscopic image provided in a lower region of the wall lower than the measured water level and a second stereoscopic image provided in an upper region of the wall higher than the measured water level,
wherein the first stereoscopic image of the stereoscopic view image is different from the second stereoscopic image of the stereoscopic view image, and
wherein the image generating unit is implemented via at least one processor.

* * * * *